(12) United States Patent
Liu

(10) Patent No.: US 12,551,142 B2
(45) Date of Patent: Feb. 17, 2026

(54) NONINVASIVE DEVICE FOR MONITOR, DETECTION, AND DIAGNOSIS OF DISEASES AND HUMAN PERFORMANCE

(71) Applicant: TAO TREASURES, LLC, Frederick, MD (US)

(72) Inventor: Xiaonao Liu, Frederick, MD (US)

(73) Assignee: TAO TREASURES, LLC, Frederick, MD (US)

( * ) Notice: Subject to any disclaimer, the term of this patent is extended or adjusted under 35 U.S.C. 154(b) by 507 days.

(21) Appl. No.: 17/751,207

(22) Filed: May 23, 2022

(65) Prior Publication Data
US 2022/0369965 A1 Nov. 24, 2022

Related U.S. Application Data

(60) Provisional application No. 63/269,151, filed on Mar. 10, 2022, provisional application No. 63/192,006,
(Continued)

(51) Int. Cl.
*A61B 5/145* (2006.01)
*A61B 5/00* (2006.01)
(Continued)

(52) U.S. Cl.
CPC ........ *A61B 5/14546* (2013.01); *A61B 5/0008* (2013.01); *A61B 5/01* (2013.01); *A61B 5/02055* (2013.01); *A61B 5/7264* (2013.01)

(58) Field of Classification Search
CPC . A61B 5/145; A61B 5/14507; A61B 5/14546; A61B 5/02055; A61B 5/00;
(Continued)

(56) References Cited

U.S. PATENT DOCUMENTS 5,433,971 A 7/1995 Royster, Jr. et al.
8,628,728 B2 1/2014 Kane et al.
(Continued)

FOREIGN PATENT DOCUMENTS

AU 2021229182 A1 10/2021
CN 101943673 A 1/2011
(Continued)

OTHER PUBLICATIONS

Ohkuwa, Tetsuo et al.; "Acetone Response with Exercise Intensity"; Advanced Gas Chromatogry—Progress in Agricultural, Biomedical and Industrial Applications, Mar. 21, 2012; pp. 151-160.
(Continued)

*Primary Examiner* — Devin B Henson
(74) *Attorney, Agent, or Firm* — NKL Law; Allen Xue

(57) ABSTRACT

A device for monitoring one or more health conditions of a subject in need thereof has a plurality of sensor arrays adapted to detect, from a skin surface of the subject, a plurality of volatile organic compounds (VOCs), one or more vital signs, or both, and to generate electrical signals; one or more processors for processing the electrical signals from the plurality of sensors, generating data, and diagnosing one or more health conditions of the subject by correlating the generated data with the one or more health conditions; an interface for outputting data and/or receiving input commands; and a fixing member for placing the device to the skin surface of the subject.

18 Claims, 14 Drawing Sheets

Related U.S. Application Data filed on May 22, 2021, provisional application No. 63/192,005, filed on May 22, 2021.

(51) Int. Cl.
  *A61B 5/01* (2006.01)
  *A61B 5/0205* (2006.01)

(58) Field of Classification Search
  CPC ... A61B 5/0002; A61B 5/7264; A61B 5/7267; A61B 5/6801; A61B 5/6802; A61B 5/6803; A61B 5/6831; A61B 5/6832; A61B 2562/04; A61B 2562/043; A61B 2562/046; A61B 2562/06; A61B 2562/063; A61B 2562/066

See application file for complete search history.

(56) References Cited

U.S. PATENT DOCUMENTS

| | | | |
|---|---|---|---|
| 10,168,315 | B2 | 1/2019 | Haick et al. |
| 10,780,411 | B2 | 9/2020 | Liu et al. |
| 11,054,428 | B2 | 7/2021 | Bhatia et al. |
| 11,353,419 | B2 | 6/2022 | Liu et al. |
| 2005/0082175 | A1 | 4/2005 | Saini et al. |
| 2008/0193734 | A1 | 8/2008 | Whitnall et al. |
| 2010/0291617 | A1 | 11/2010 | Trevejo et al. |
| 2014/0276201 | A1 | 9/2014 | Woloszko et al. |
| 2015/0247832 | A1 | 9/2015 | Swager et al. |
| 2015/0346190 | A1 | 12/2015 | Sambandan |
| 2016/0356741 | A1 | 12/2016 | Makaram et al. |
| 2017/0143881 | A1 | 5/2017 | Topaz |
| 2017/0281064 | A1 | 10/2017 | Bayon |
| 2017/0343501 | A1 | 11/2017 | Serban et al. |
| 2019/0151640 | A1* | 5/2019 | Weber .......... A61B 5/0002 |
| 2019/0167211 | A1* | 6/2019 | Everman ........ G09B 9/10 |
| 2019/0336932 | A1 | 11/2019 | Liu et al. |
| 2019/0360960 | A1 | 11/2019 | Liu et al. |
| 2020/0281519 | A1 | 9/2020 | Gowans et al. |
| 2021/0379425 | A1 | 12/2021 | Tran |
| 2022/0007972 | A1* | 1/2022 | Thors .............. A61B 5/083 |
| 2022/0369965 | A1 | 11/2022 | Liu |
| 2023/0200725 | A1 | 6/2023 | Liu |

FOREIGN PATENT DOCUMENTS

| | | |
|---|---|---|
| CN | 102183563 A | 9/2011 |
| CN | 103050192 A | 4/2013 |
| CN | 103106950 A | 5/2013 |
| CN | 104986759 A | 10/2015 |
| CN | 107290418 A | 10/2017 |
| CN | 107705996 A | 2/2018 |
| CN | 105232229 B | 7/2018 |
| CN | 108445070 A | 8/2018 |
| CN | 109298046 A | 2/2019 |
| CN | 211576693 U | 9/2020 |
| CN | 113406174 A | 9/2021 |
| EP | 3567131 A1 | 11/2019 |
| JP | S59122939 A | 7/1984 |
| JP | 2002518668 A | 6/2002 |
| JP | 2002518668 A5 | 8/2006 |
| JP | 2019527566 A | 10/2019 |
| JP | 2019527566 A5 | 6/2020 |
| JP | 2021502845 A | 2/2021 |
| JP | 2021502845 A5 | 12/2021 |
| WO | 2012/056223 A1 | 5/2012 |
| WO | 2017/121792 A1 | 7/2017 |
| WO | 2020/152370 A1 | 7/2020 |

OTHER PUBLICATIONS

Xing, Ruiqing et al., "Au modified three-dimensional $In_2O_3$ inverse opals: synthesis and improved performance for acetone sensing toward diagnosis of diabetes"; Nanoscale; vol. 7, No. 30; Aug. 14, 2015; pp. 1-9.

King, Julian et al., "Measurement of endogenous acetone and isoprene in exhaled breath during sleep", Physiological Measurement, vol. 33, pp. 413-428. 2012.

Zhou, Xin et al., "Nanosheet-Assembled ZnFe2O4 Hollow Microspheres for High-Sensitive Acetone Sensor", Applied Materials & Interfaces, pp. A-H, Accepted: Jun. 23, 2015.

Choi, Seon-Jin et al., "Selective Detection of Acetone and Hydrogen Sulfide for the Diagnosis of Diabetes and Halitosis Using SnO2 Nanofibers Functionalized with Reduced Graphene Oxide Nanosheets", Applied Materials & Interfaces, pp. 2588-2597, Published: Jan. 23, 2014.

Choi, Seon-Jin et al., "Selective Diagnosis of Diabetes Using Pt-Functionalized WO3 Hemitube Networks as a Sensing Layer of Acetone in Exhaled Breath", Analytical Chemistry, pp. 1792-1796, Published: Dec. 20, 2012.

Righettoni, Marco et al., "Si:WO3 Sensors for Highly Selective Detection of Acetone for Easy Diagnosis of Diabetes by Breath Analysis", Analytical Chemistry, vol. 82, No. 9, pp. 3581-3587, May 1, 2010.

Yang, Chia-Ming et al., "Ultraviolet illumination effect on monolayer graphene-based resistive sensor for acetone detection", Vacuum, vol. 140, pp. 89-95, Jun. 2017.

Staerz, Anna et al., "Understanding the Potential of WO3 Based Sensors for Breath Analysis", Sensors, vol. 16, No. 1815, Published: Oct. 29, 2016.

Kim, Do Hong et al., "Vertically Ordered Hematite Nanotube Array as an Ultrasensitive and Rapid Response Acetone Sensor", Applied Materials & Interfaces, pp. 1-21, Published (Web): Aug. 26, 2014.

Dey et al., Dissertation, 2004, 1-117 (Year: 2004).

Singh, Eric et al., "Flexible Graphiene-Based Wearable Gas and Chemical Sensors", ACS Applied Materials & Interfaces, vol. 9, No. 40, pp. 34544-34586, 2017.

Jalal, Ahmed Hasnain et al., "A Fuel Cell Based Sensing Platform for Selective Detection of Acetone in Hyperglycemic Patients", ECS Transactions, vol. 80, No. 10, p. 1369, 2017.

Kaur, Jasmeet et al., "Sensitive and selective acetone sensor based on Gd doped WO3/reduced graphene oxide nanacomposite", Sensors and Actuators B: Chemical, vol. 258, pp. 1022-1035, Apr. 1, 2018.

Cao, Wenqing et al., "Current Status of Methods and Techniques for Breath Analysis", Critical Reviews in Analytical Chemistry, vol. 37, No. 1, pp. 3-13, 2007.

Amann, Anton et al., "Breath Analysis: The Approach Towards Clinical Applications", Mini-Reviews in Medicinal Chemistry, vol. 7, No. 2, pp. 115-129, 2007.

Deng, Chunhui et al., "Determination of acetone in human breath by gas chromatography-mass spectrometry and solid-phase microextraction with on-fiber derivatization", Journal of Chromatography B, vol. 810, No. 2, pp. 269-275, Oct. 25, 2004.

Turner, Claire et al., "A longitudinal study of ammonia, acetone and propanol in the exhaled breath of 30 subjects using selected ion flow tube mass spectrometry, SIFT-MS", Physiological Measurement, vol. 27, No. 4, pp. 321-337, 2006.

Deveci, S. Erhan et al., "The measurement of exhaled carbon monoxide in health smokers and non-smokers", Respiratory Medicine, vol. 98, No. 6, pp. 51-556, Jun. 2004.

Van Den Velde, Sandra et al., "GC-MS analysis of breath odor compounds in liver patients", Journal of Chromatography B, vol. 875, No. 2, pp. 344-348, Nov. 15, 2008.

Paredi, Paolo et al., "Exhaled Ethane, a Marker of Lipid Peroxidation, is Elevated in Chronic Obstructive Pulmonary Discease", American Journal of Respiratory and Critical Care Medicine, vol. 162, No. 2, pp. 369-373, Aug. 2000.

Stamyr, Kristin et al., "Background levels of hydrogen cyanide in human breath measured by infrared cavity ring down spectroscopy", vol. 14, No. 5, pp. 285-291, Jun. 2009.

Massaro, A.F. et al., "Expired nitric oxide levels during treatment of acute asthma", American Journal of Respiratory and Critical Care Medicine, vol. 152, No. 2, pp. 800-803, 1995.

(56) References Cited

OTHER PUBLICATIONS

Peng, Gang et al., "Diagnosing lung cancer in exhaled breath using gold nanoparticles", Nature Nanotechnology, vol. 4, pp. 669-673, 2009.

Phillips, Michael et al., "Volatile organic compounds in breath as markers of lung cancer: a cross-sectional study", The Lancet, vol. 353, No. 9168, pp. 1930-1933, Jun. 5, 1999.

Smith, David et al., "Quantification of acetaldehyde released by lung cancer cells in vitro using selected ion flow tube mass spectrometry", Rapid Communications in Mass Spectrometry, vol. 17, No. 8, pp. 845-850, 2003.

Kamat, Pratyuma et al., "Measurement of acetaldehyde in exhaled breath using a laser absorption spectrometer", Applied Optics, vol. 46, No. 19, pp. 3969-3975, 2007.

Giubileo, Gianfranco, "Medical diagnostics by laser-based analysis of exhaled breath", Proc. SPIE, vol. 4762, pp. 318-325, 2002.

Yu, Hao et al., "Detection volatile organic compounds in breath as markers of lung cancer using a novel electronic nose", Sensors, 2003 IEEE, vol. 2, pp. 1333-1337, 2003.

Di Natale, Corrado ee al., "Lung cancer identification by the analysis of breath by means of an array of non-selective gas sensors", Biosensors and Bioelectronics, vol. 18, No. 10, pp. 1209-1218, Sep. 2003.

Nakhleh, Morad K. et al., "Diagnosis and Classification of 17 Diseases from 1404 Subjects via Pattern Analysis of Exhaled Molecules", ACS Nano, vol. 11, No. 1, pp. 112-125, 2016.

Li, Lei et al., "Three-Dimensional Mesoporous Graphene Aerogel-Supported SnO2 Nanocrystals for High-Performance NO2 Gas Sensing at Low Temperature", Analytical Chemistry, vol. 87, No. 3, pp. 1638-1645, 2015.

Wu, Zhong-Shual et al., "Three-Dimensional Graphene-Based Macro- and Mesoporous Frameworks for High-Performance Electrochemical Capacitive Energy Storage", Journal of the American Chemical Society, vol. 134, No. 48, pp. 19532-19535, 2012.

Devi, G. Sarala et al., "Synthesis of mesoporous TiO2-based powders and their gas-sensing properties", Sensors and Actuators B: Chemical, vol. 87, No. 1, pp. 122-129, Nov. 15, 2002.

Cabot, A. et al., "Mesoporous catalytic filters for semiconductor gas sensor", Thin Solid Films, vol. 436, No. 1, pp. 64-69 Jul. 22, 2003.

Yu, Ji Haeng et al., "Electrical and CO gas sensing properties of ZnO-SnO2 composites", Sensors and Actuators B: Chemical, vol. 52, No. 3, pp. 251-256, Oct. 15, 1998.

Zhu, C.L. et al., "Synthesis and enhanced ethanol sensing properties of a-Fe2O3/ZnO heteronanostructures", Sensors and Actuators B: Chemical, vol. 140, No. 1, pp. 185-189, Jun. 18, 2009.

Meixner, H. et al., "Metal oxide sensors", Sensors and Actuators B: Chemical, vol. 33, Nos. 1-3, pp. 198-202, Jul. 1996.

Sun, Hao et al., "Sensor Array Optimization of Electronic Nose for Detection of Bacteria in Wound Infection", IEEE Transactions on Industrial Electronics, vol. 64, No. 9, pp. 7350-7358, Sep. 2017.

Ratiu, Ileana-Andreea et al., "An Optimistic Vision of Future: Diagnosis of Bacterial Infections by Sensing Their Associated Volatile Organic Compounds", Critical Reviews in Analytical Chemistry, vol. 50, No. 6, pp. 501-512, 2020.

OECD, Life Expectancy at Birth, https://data.oecd.org/healthstat/life-expectancy-at-birth.htm (Accessed Jun. 4, 2016).

"Age of reference person: Annual expenditure means, shares, standard errors, and coefficients of variation, Consumer Expenditure Survey, 2019", https://www.bls.gov/cex/2019/combined/age.pdf, Sep. 2020.

US Patent Office; International Search report and Written Opinion in corresponding International Application No. PCT/US23/63836, PCT/ISA; mailed Sep. 5, 2023; pp. 1-2.

US Patent Office; International Search report and Written Opinion in corresponding International Application No. PCT/US23/064185, PCT/ISA; mailed Sep. 25, 2023; pp. 1-9.

\* cited by examiner

NONINVASIVE DEVICE FOR MONITOR, DETECTION, AND DIAGNOSIS OF DISEASES AND HUMAN PERFORMANCE

CROSS-REFERENCE TO RELATED APPLICATIONS

This application claims the benefit of priority under 35 U.S.C. § 119 to U.S. Provisional Application No. 63/192,005, filed May 22, 2021, U.S. Provisional Application No. 63/192,006, filed on May 22, 2021, and U.S. Provisional Application No. 63/269,151, filed on Mar. 10, 2022, the entire contents of which are incorporated herein by reference in their entireties.

TECHNICAL FIELD

The current disclosure provides wearable and portable non-invasive devices for monitoring, screening, detecting, and diagnosis of health conditions, such as diseases and human performance, using volatile organic compounds (VOCs) released from a subject, especially devices that employs sensors that detect VOCs released from a subject.

BACKGROUND

The healthcare expenditures are a major budget item of many countries, reaching ca. 10% of the gross domestic product (GDP) in many of them, and peaking to 17% of the GDP in the United States of America. The average medical care cost for seniors is around $6,833 per year. The average cost of long-term care needs for seniors and disabled individuals is in the range of $4,000-$7,000 per month. The long-term economic sustainability of most developed medical systems is fragile, and many European states are forced to curtail their healthcare expenditures. In addition, novel risk factors such as the rise of antibiotic-resistant superbugs and anthropogenic diseases undermine our future reliance on established medical praxis.

Preventive and personalized medicine provides an opportunity to decrease overall costs of healthcare services while improving their quality. Very-early-stage medical diagnostics can significantly increase the success rate for treating widespread diseases such as lung cancer and melanoma, while decreasing the overall treatment costs. Recurrent monitoring of important biomarkers and taking corrective actions help to prevent the development of chronic illnesses such as asthma and circulatory system disorders. While such large-scale screenings are helpful in fighting against severe diseases such as prostate and breast cancer, the high cost of many medical diagnostics approaches does not allow using similar screening approaches for many other diseases. Therefore, there is a need for effective, economic, and non-invasive diagnostics.

Recent studies demonstrated that human body emits hundreds of volatile organic compounds (VOCs) from skin and breath, some of which can be utilized as biomarkers of various diseases and physiological changes, such as lung cancer, oxidative stress, diabetes, infections, etc. A rapid wearable and portable diagnosis of breath and skin vapor biomarkers may offer a real-time, accurate test for health monitoring, disease screening and diagnosis. However, breathalyzers detecting the exhaled breath require blowing into the device potentially spreads possible virus-containing droplets. Breath and skin VOC concentrations (such as acetone and ethanol) can be highly correlated. For example, breath and skin VOC biomarkers have been shown to coincide in diabetes and infectious diseases. Skin VOC analysis can be even more precise than breath VOC analysis as it excludes factors such as the flow rate of exhalation and mouth odors. Therefore, due to its simplicity and high sensitivity, skin VOC testing can be a safe, non-invasive, rapid, and practical monitoring, screening, and diagnosing tool of diseases. Such diseases include infections, hypoxia, and flu, asthma, COVID-19, hypoglycemia, acidosis, coagulopathy, diabetes, melanoma in skin cancer, epileptic patients, Parkinson's disease, idiopathic Parkinson's, atypical Parkinsonism, Alzheimer's disease, colorectal cancer, lung cancer, bladder cancer, breast cancer, head and neck cancer, ovarian cancer, prostate cancer, kidney cancer, gastric cancer, Crohn's disease, ulcerative colitis, irritable bowel syndrome, multiple sclerosis, pulmonary arterial hypertension, pre-eclampsia, chronic kidney disease, cancer, and hyper/hypo glycaemia with untold possibilities, especially infectious disease detection.

Though portable multiple skin VOC analyzers would provide for a powerful tool for screening diseases, few such devices are commercially available. Development of such a device has been challenging. Semiconductor-based gas sensors have detection limits around ppm (parts per million), but skin VOCs typically are in ppb (parts per billion). For example, normal reference range is 0.38-766 ppb for acetone, 44-150 ppb for isopropanol, and 0.6-45 ppb for butyraldehyde 0.6-45 ppb. Accordingly, current highly sensitive methods for skin VOC analysis employs large and non-portable equipment, such as gas chromatography (GC), mass spectrometry, or infrared spectroscopy. Further, typical skin VOC measurement requires skin gas collection bags, cooling concentrators, or trapping filters, which are not practical for a portable device and rapid tests.

For reasons discussed above, there is a need in the art for small, sensitive, and accurate non-invasive device.

SUMMARY

This disclosure provides a device for monitoring one or more health conditions of a subject in need thereof. The device has a plurality of sensor arrays adapted to detect, from a skin surface of the subject, a plurality of volatile organic compounds (VOCs), one or more vital signs, or both, and to generate electrical signals; one or more processors for processing the electrical signals from the plurality of sensors, generating data, and diagnosing one or more health conditions of the subject by correlating the generated data with the one or more health conditions; an interface for outputting data and/or receiving input commands; and a fixing member for placing the device to the skin surface of the subject.

In some embodiments, the device has a housing having one or more openings. Each of the one or more openings is connected to at least one of the plurality of sensor arrays through a conduit.

In other embodiments, one or more of the plurality of sensor arrays contains a plurality of sensors. Each sensor changes resistance when exposed to one or more VOCs. Such one or more VOCs is selected from aldehydes, alcohols, ketones, acids, Sulphur containing compounds, esters, hydrocarbons and nitrogen containing compounds, propene, acetaldehyde, ethanol, acetonitrile, (E)-2-Butene, (Z)-2-butene, 2-propenal, n-propanal, Acetone, 2-propanol, dimethyl sulfide, 1-pentene, isoprene, n-Pentane, 1,3-Dioxolane, 2-methyl-2-propenal, 2-methyl-Propanal, 3-Buten-2-one, 2-methyl Furan, n-Butanal, 2-Butanone, 3-methyl Furan, Ethyl Acetate, 2-Butenal, 2-methyl-1,3-Dioxolane, 2-methyl-2-Pentene, 2,3-dimethyl-2-Butene, (E)-2-Methyl-1,3-pentadiene, (Z)-2-Methyl-1,3-pentadiene, 3-methyl-Butanal, 2-methyl-Butanal, Isopropyl acetate, 2-Pentanone, 2,5-dimethyl Furan, allyl methyl Sulfide, n-Pentanal, 3-methyl-2-Butenal, 1-Heptene, 2-Heptene, n-Heptane, 2-ethyl-Butanal, 4-Methyl-3-penten-2-one, Isobutyl acetate, 2-Hexanone, n-Hexanal, gamma-Butyrolactone, n-Butyl acetate, (E)-2-Hexenal, 1-Octene, n-Octane, 2-Heptanone, n-Heptanal, Benzaldehyde, 1-Nonene, n-Nonane, 6-Methyl-5-hepten-2-one, 2-pentyl-Furan, b-Pinene, n-Octanal, p-Cymene, DL-Limonene, Styrene, Eucalyptol, n-Nonanal, 2-Ethylhexanol, 3-Methylhexane, Butyraldehyde, Ethylbenzene, Ethyl butanoate, toluene, undecane, $H_2O$, CO, NO, $N_2O$, $NO_2$, ammonia, Acetophenone, 4-methylphenol, Dodecane, Dimethyl pyrazine, 2-Pentanol, 2-butanol, 2-pentene, 2-methylbutyl isobutyrate, 2-methoxy-5-methylthiophene, amyl isovalerate; 2-methylbutyl 2-methylbutyrate, 6-tridecane, 3-methyl 1H-pyrrole, 2-methyl-3-(2-propenyl)-pyrazine, 2,3-dimethyl-5-isopentylpyrazine, Methyl thiolacetate, Methyl thiocyanate, Hydrogen cyanide, 2-aminoacetophenone, 1-undecene, Formaldehyde, Dimethyl ether, carbon dioxide, pentafluoropropionamide, Methyl cyclohexane, 2-methylbutanol, N-propyl acetate, Butanal, 2,5-dimethyltetrahydrofuran, Carbon disulfide, methyl propanoate, methyl butanoate, 6-methyl-5-hepten-2-one, 2,5-dimethylpyrazine, Hydrogen sulfide, Propanol, Indole, 1,1,2,2-tetrachloroethane, Butanol, 2-tridecenone, 3-hydroxy-2-butanone, 1-hydroxy-2-propanone, 3-nitro-benzenesulfonic acid, Isobutyric acid, methyl ester, 1,2-dimethyl-benzene, 2-ethyl-1-hexanol, Isopentyl 3-methylbutanoate, 2,4-dinitro-benzenesulfonic acid, Decanal, 2-methyl-1-propanol, 2-phenylethanol, 1,4-dichlorobenzene, 2-methylbutanoic acid, methyl mercaptan, 2-nonanone, 3-methyl-1-butanol, 3-methylbutanoic acid, dimethyl trisulfide, dimethyl disulfide, acetic acid.

In still other embodiments, the one or more of the plurality of sensor arrays contains a plurality of physiological sensors, each physiological sensor is adapted to detect at least one parameter selected from heart rate, pulse rate, respiratory rate, blood oxygen saturation, blood pressure, hydration level, stress, position & balance, body strain, neurological functioning, brain activity, blood pressure, cranial pressure, auscultatory information, skin and body temperature, eye muscle movement, sleep, cholesterol, lipids, blood panel, body fat density, muscle density, temperature, humidity, and pressure.

In certain embodiments, the interface of the device has WiFi card, a Bluetooth card, or a USB card; and/or a display having a touch screen adapted to receive manual input from a user.

The fixing member of the device can be one selected from armband, wound dressing, sleeve, jacket, eye wear, goggle, glove, watch, wristband, bracelet, nose ring, ear bud, earphone, article of clothing, hat, a headband, headset, bra, jewelry, patch, and adhesive tape.

In still other embodiments, the one or more health conditions are selected from infections, inflammatory disorders, Pancreatitis, Pneumonia, Sepsis/Septic shock, hypoxia, flu, asthma, COVID-19, virus, Fungi, bacteria, Hypoglycemia, diabetes, cancer, Melanoma in skin cancer, colorectal cancer, lung cancer, bladder cancer, breast cancer, colon cancer, head and neck cancer, ovarian cancer, prostate cancer, kidney cancer, gastric cancer, uterine cancer, liver cancer, Endocrine and Metabolic disease, Addison's Disease, Hyperaldosteronism, Hyperlipidemia, Gastrointestinal and Hepatic disease, Crohn's disease, Nonalcoholic steatohepatitis Peptic ulcer disease, Neurologic disease, Seizure, Sleep apnea, Psychiatric disease, Alzheimer's disease, Autism spectrum disorder, ulcerative colitis, irritable bowel syndrome, metabolic disorder, multiple sclerosis, pulmonary arterial hypertension, pre-eclampsia, chronic kidney disease, Epileptic patients, Parkinson's disease, idiopathic Parkinson's, atypical Parkinsonism, hyper/hypo glycaemia, ketone, fat burning, human performance, and ketoacidosis.

In one of the embodiment of the device, during operation, at least one of the one or more processor generate data by executing a method selected from Naïve Bayes, principal component analysis (PCA), support vector machine (SVM), multi-layer perception (MLP), generalized regression neural network (GRNN), fuzzy inference systems (FIS), self-organizing map (SOM), radial bias function (RBF), genetic algorithms (GAS), neuro-fuzzy systems (NFS), adaptive resonance theory (ART), partial least squares (PLS), multiple linear regression (MLR), principal component regression (PCR), discriminant function analysis (DFA), linear discriminant analysis (LDA), cluster analysis, and nearest neighbor.

In still other embodiments, during operation, the one or more processor executes an algorithm that receive further comprising a memory that stores an executable program one or more processors for processing the electrical signals from the plurality of sensors, generating data, and diagnosing one or more health conditions of the subject by correlating the generated data with the one of the one or more health conditions.

The current disclosure further provides a method for diagnosing one or more health conditions of a subject in needed thereof. The method includes the steps of attaching the device of claim 1 to a skin surface of the subject; obtaining data corresponding to VOCs, vital signs, or both of the subject; and correlating the data with one or more health conditions.

In certain methods, the data is displayed on the interface, and/or be transmitted to a computer for storage or for further processing.

The disclosure further discloses a system for monitoring one or more health conditions of a subject in need thereof. The system includes the device of this disclosure that is physically, electrically, and/or signally connected to a host device. The host device can be one of the following: wearable device, wearable watch, wearable band, glucose patch, wearable clothing, wearable jewelry, head-mounted display, smart ring, smart glasses, smart card, smart shoe, e-textile, smart connected products, wearable computer, healthcare device, medical device, hospital stretcher, defibrillator, anesthesia machine, patient monitor, sterilizer, Electrocardiogram machine, surgical table, blanket and fluid warmer, electrosurgical unit, bandage, heating pad, prosthetic device, artificial arm, artificial leg, orthotic device, leg brace, shoe insert, wound dressing system, transparent films dressing, foams dressing, hydrocolloids dressing, alginates dressing, composites dressing, cloth dressing, antimicrobial dressings, low adherent dressings, semipermeable films dressing, gauze sponge dressing, gauze bandage dressing, non-adherent pads, non-adherent wet dressings, calcium alginates dressing, hydrogel dressing, hypothermia bag, gas chromatography (GC), mass spectrometry, gas chromatography-mass spectrometry (GC-MS), infrared spectroscopy, and a combination thereof.

In the system, the device may be wireless connected to the host device or may be plugged into a power source in the host device.

BRIEF DESCRIPTION OF DRAWINGS

FIG. 3b includes two 2-D graphs presenting the same data in FIG. 3a.

DETAILED DESCRIPTION

Figure 1:
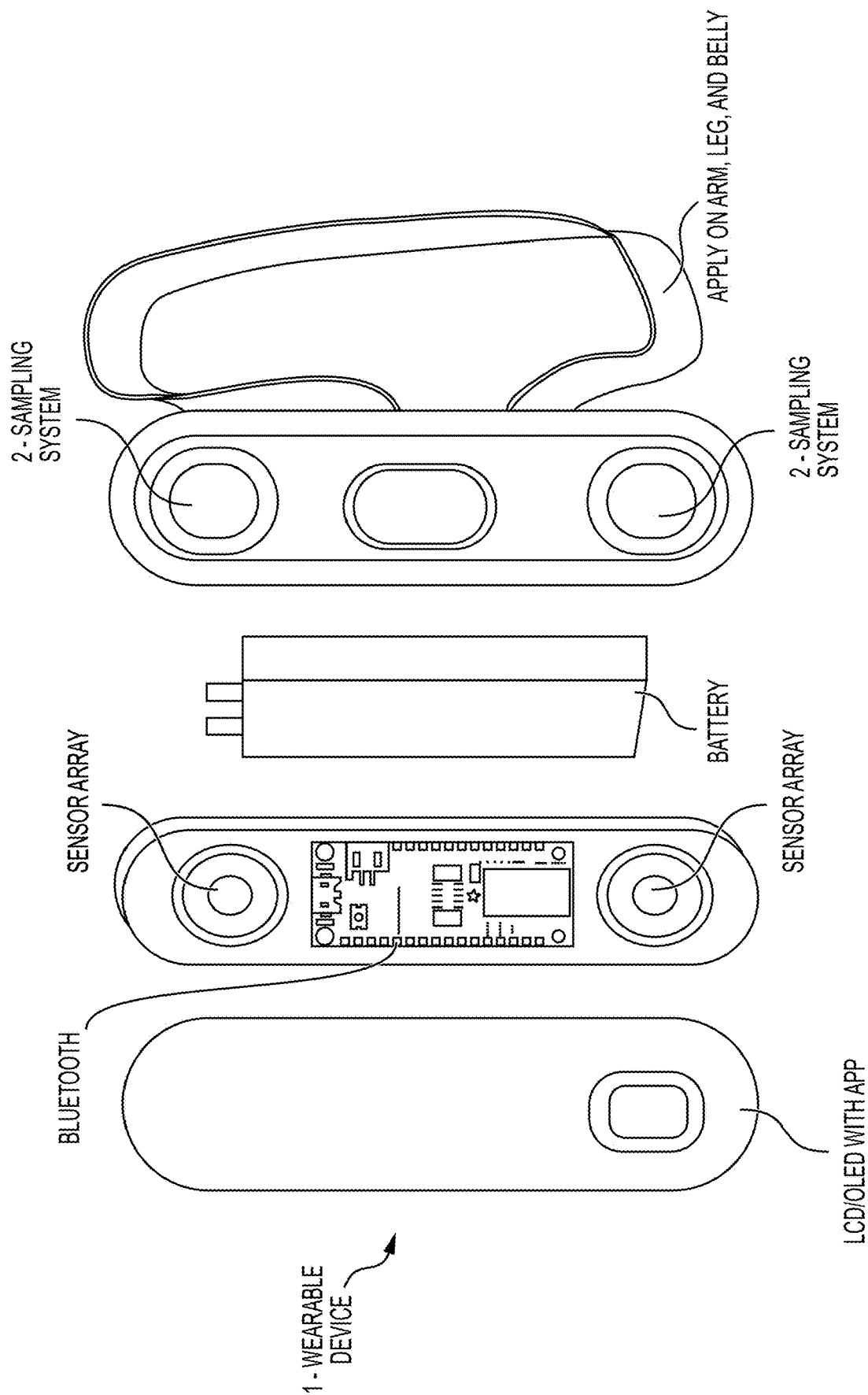
FIG. 1 illustrates an exemplary wearable device of the current disclosure.

Reference will now be made in detail to embodiments, examples of which are illustrated in the accompanying drawings, wherein like reference numerals refer to the like elements throughout the several views. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the disclosure. The terms "comprises" and/or "comprising" are used to specify the presence of stated elements, steps, operations, and/or components, but do not preclude the presence or addition of one or more other elements, steps, operations, and/or components. The terms "first," "second," and the like may be used to describe various elements, but do not limit the elements. Such terms are only used to distinguish one element from another.

As used herein, the singular forms "a", "an", and "the" may include both singular and plural referents unless the context clearly dictates otherwise. The term "optional" or "optionally" means that the subsequent described event, circumstance or substituent may or may not occur, and that the description includes instances where the event or circumstance occurs and instances where it does not. The recitation of numerical ranges by endpoints includes all numbers and fractions subsumed within the respective ranges, as well as the recited endpoints.

The terms "about" or "approximately" as used herein when referring to a measurable value such as a parameter, an amount, a temporal duration, and the like, are meant to encompass variations of and from the specified value, such as variations of +/−10% or less, +/−5% or less, +/−1% or less, and +/−0.1% or less of and from the specified value, insofar such variations are appropriate to perform in the disclosed invention. It is to be understood that the value to which the modifier "about" or "approximately" refers is itself also specifically, and preferably, disclosed.

The terms "subject," "individual," and "patient" are used interchangeably herein to refer to a vertebrate, preferably a mammal, more preferably a human. Mammals include, but are not limited to, murines, simians, humans, farm animals, sport animals, and pets. Tissues, cells and their progeny of a biological entity obtained in vivo or cultured in vitro are also encompassed.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

The term "real-time" is used to describe a process of sensing, processing, or transmitting information in a time frame which is equal to or shorter than the minimum timescale at which the information is needed. For example, the real-time monitoring of pulse rate may result in a single average pulse-rate measurement every minute, averaged over 30 seconds, because an instantaneous pulse rate is often useless to the end user. Typically, averaged physiological and environmental information is more relevant than instantaneous changes. Thus, in the context of the present invention, signals may sometimes be processed over several seconds, or even minutes, in order to generate a "real-time" response.

The term "monitoring" refers to the act of measuring, quantifying, qualifying, estimating, sensing, calculating, interpolating, extrapolating, inferring, deducing, or any combination of these actions. More generally, "monitoring" refers to a way of getting information via one or more sensing elements. For example, "blood health monitoring" includes monitoring blood gas levels, blood hydration, and metabolite/electrolyte levels. The term "health" refers generally to the quality or quantity of one or more physiological parameters with reference to an organism's functional abilities. The term "sickness and/or disease" refers generally to aspects of a sickness, disease, or injury in an individual or group of individuals. The terms "infection" and "bacterial infection" indicates the presence and/or colonization of pathogenic bacteria in or on a subject in a number or an amount sufficient to be pathogenic, that is sufficient to cause disease, damage or harm to a subject infected with said bacterium. A subject having an infection is said to be "infected" with a pathogen. Pathogenic bacteria or short "pathogens" as used herein are bacteria that are known to cause bacterial infections in subjects.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure, or characteristic described in connection with the embodiment is included in at least one embodiment of the present invention.

Thus, appearances of the phrases "in one embodiment," "in an embodiment," or "an example embodiment" in various places throughout this specification are not necessarily all referring to the same embodiment. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention. For example, in the appended claims, any of the claimed embodiments can be used in any combination.

The devices and sensors herein may be used for rapid monitoring, screening, detecting, and diagnosis of diseases and human performance using VOCs released from a subject, (e.g., skin of palm, finger, ear, nose, face, eye, arm, leg, chest, breast, back, abdomen, and/or or foot), thus allowing real-time monitoring the dynamic changes in of VOCs. Smart sensors in conjugation with pattern recognition and machine-learning algorithms enables early detection of diseases and monitoring human performance.

One of the methods rapid monitoring, screening, and diagnosis of diseases and human performance includes: applying the device on or in proximity of the skin; detecting VOCs in gases, vapors, or odor released from a subject formed therefrom emanating from the skin in real-time using the sensor array; analyzing the electrical characteristics in response thereto; recognizing and identifying the types of VOCs, their relative amounts, and patterns using pattern recognition and machine learning algorithms; visualizing, monitoring, screening, detecting, and diagnosing the onset and disease progression, and human health status.

The non-invasive device for rapid monitoring, screening, detecting, and diagnosis of diseases and human performance in a subject in real-time may be a wearable device. The wearable devices may be an armband, a sleeve, a jacket, glasses, eye wears, goggles, a glove, a watch, a wristband, a bracelet, a nose ring, ear bud, earphone, an article of clothing, a hat, a headband, a headset, a bra, and jewelry.

FIG. 1 shows an exemplary embodiment of a wearable device. It has top cover having an indicators such as OLED (or an LCD display which a user may interact with), showing the status of the device, a bottom cover having two cup-shaped inlets adapted to be attached to the surface of a test subject, as well as electronics and a battery to be housed between the top and the bottom cover. The cup-shaped inlets are adapted to allow VOCs emanated from the test subject to enter the device. The electronics includes two sensor arrays, each having multiple sensors for detecting VOCs, a chip containing electronics for recording (e.g., in a non-volatile memory), processing (e.g., by a processor), and transmitting (e.g., through Bluetooth card, Wifi card) data. The battery that powers the electronics. In this embodiment, a cup-shaped inlet on the bottom cover is connected with a sensor array in the electronics through a conduit (e.g., a tube) so that the sensor array is exposed to VOCs entering the inlet immediately. The device has a strap to affix it to a limb or the torso of a human or a mammal subject, e.g., to palm, finger, ear, nose, face, eye, arm, leg, chest, breast, back, abdomen, and/or or foot.

In certain embodiments, the inlet on the device is covered by a membrane that is waterproof and/or breathable. The sensor array contains multiple VOC sensors that react to VOCs and produce signals when exposed to gases, vapors, or odor containing VOCs released from a subject as well as one or more physiological sensors. The device can integrate with multiple commercially available physiological sensors for monitoring vital signals. Such vital signals may include heart rate, pulse rate, respiratory rate, blood oxygen saturation, blood pressure, hydration level, stress, position & balance, body strain, neurological function, brain activity, blood pressure, cranial pressure, auscultatory information, skin and body temperature, sleep, cholesterol, lipids, blood panel, body fat density, muscle density. Additional sensors may be installed that monitor environment conditions, such as temperature, humidity, and pressure. The collected data can be used for pattern recognition and machine learning algorithms, which can be used for detection of diseases and perform other functions.

In other embodiments, the sensor array contains at least one or two or three or four or eight or twelve or more sensors, which may be used for detecting one or more VOCs from metabolite gas mixtures emanated from the skin of a subject.

Figure 2:
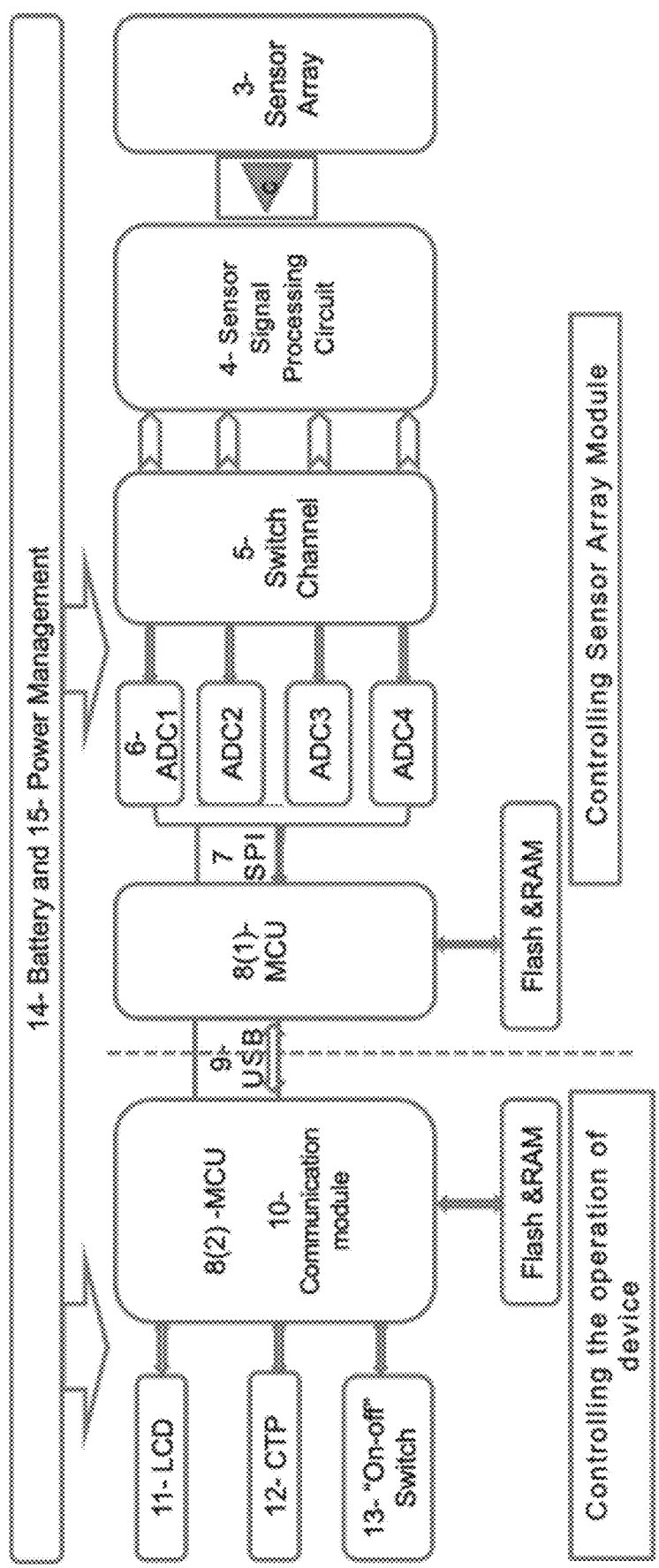
FIG. 2 is a diagram shows components in a device of the current disclosure.

FIG. 2 is a block diagram illustrating various components in an exemplary device of the current disclosure. It shows a sensor array that contains a plurality of VOC sensors and/or physiological sensors. The plurality of sensor signals are sent to the sensor signal processing circuit 4 to be processed. The switch channel 5 selects signals from one of the sensors at a time and send it to one of the analog-to-digital converters (ADC) 6 to convert it to digital signals. The digital signals pass through the serial peripheral interface (SPI) 7 into the micro-controller Unit (MCU) 8(1). The MCU 8(1) may be connected to a Flash memory or a RAM for data storage and/or retrieval. In the embodiment of FIG. 2, MCU 8(1) is connected to MCU 8(2) through a USB interface. MCU 8(2) is a part of the communication module 10, which transfers the processed output to proximate devices via a communication device, e.g., a Bluetooth card or a WIFI card. The communication module 10 is further connected to its own Flash/RAM memory, as well as user interface such as a liquid crystal display (LCD) 11, a capacitive touch panel (CTP) 12, and an on-off switch 13. The battery 14 and the power management circuit 15 controls the power supply to the sensor array and other electronics. Note that a user can control the sensor array 3 by sending commands through the user interface. The device may also have embedded firmware that runs the device.

In certain embodiments, raw data detected by sensor array 3 or processed data is transferred wirelessly in real-time to a cellphone or laptop, and/or to a designated server for data analysis and storage. The transferred data may include vital signs (such as heart rate, blood pressure, respiratory rate, blood oxygen saturation, and skin and body temperature), VOCs information, and environment condition (time, temperature, humidity, and pressure). Based on collected information, a comprehensive database can be built to support the pattern recognition and machine learning algorithms for early detection of wound infection.

In some of the embodiments, the device measures the VOCs using nanostructured sensor array. The sensor array contains a plurality of sensors, for example between 2 and 6 and 8 and 12 and 32 sensors or more, each containing a material that changes certain properties, e.g., resistance, when contacts certain VOCs.

Figure 3A:
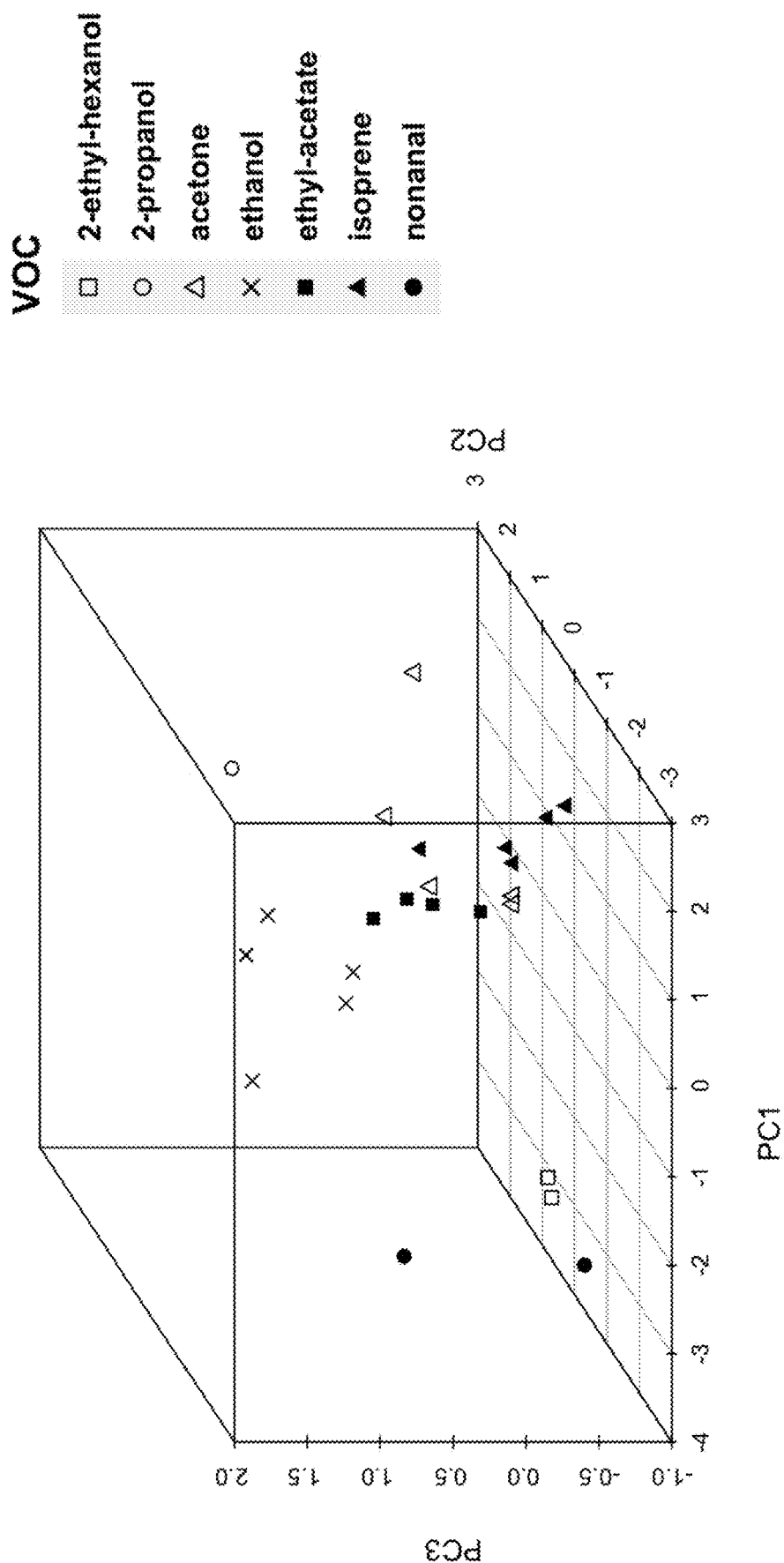
FIG. 3a is a 3-D graph presenting results of principle component analysis (PCA), showing changes in the relative resistance of the sensors in response to multiple concentrations of skin VOCs.
Figure 3B:
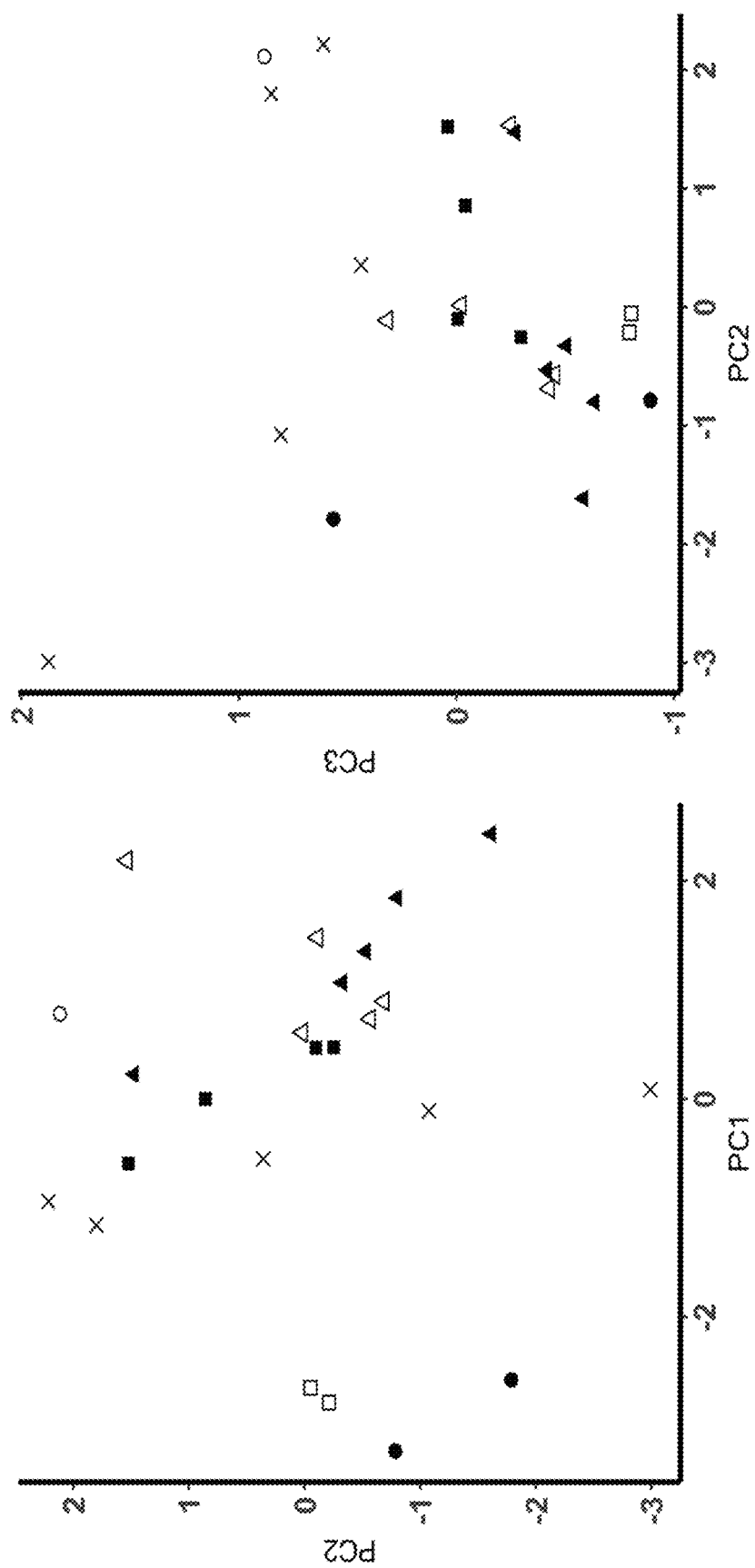

FIGS. 3a and 3b show results of principal component analysis (PCA) of signals from seven VOCs, namely, 2-ethylhexanol, 2-propanol, acetone, ethanol, ethyl acetate, isoprene, and nonanal. Specifically, they indicate changes in the relative resistance of VOC sensors in response to the seven VOCs ranging from low concentration (ppb, particle per billions) to high concentration (ppm, particle per millions).

PCA is an effective means of extracting key information from multi-dimensional array data. PCA can transform a set of correlated variables into a substantially smaller set of uncorrelated variables as principal components (PCs), which can capture most information from the original data. After condensing data into a lower dimension presentation, one can find the array readout of different targeted species were clustered into distinct groups. The three axes in FIG. 3a are the first three principal components, while FIG. 3b shows two graphs that are projections of data onto the PC1-PC2 plane and the PC2-PC3 plane, respectively.

Each dot in FIGS. 3a and 3b represents one skin-emanated VOCs. Most of dots in the graph of FIGS. 3a and 3b are clearly separated, which indicates that sensor array has great discriminative capability to discern different VOCs. Certain diseases have their own VOC patterns or VOC signatures, in which one disease has a characteristic VOC pattern that distinguishes it from other diseases. For example, the VOC pattern may show certain VOCs but not others, and/or certain VOCs are characteristically high or low, and/or in a certain range. For example, the seven VOCs in FIGS. 3a and 3b may form signature VOC patterns that correlate to up to twenty diseases.

Figure 4:
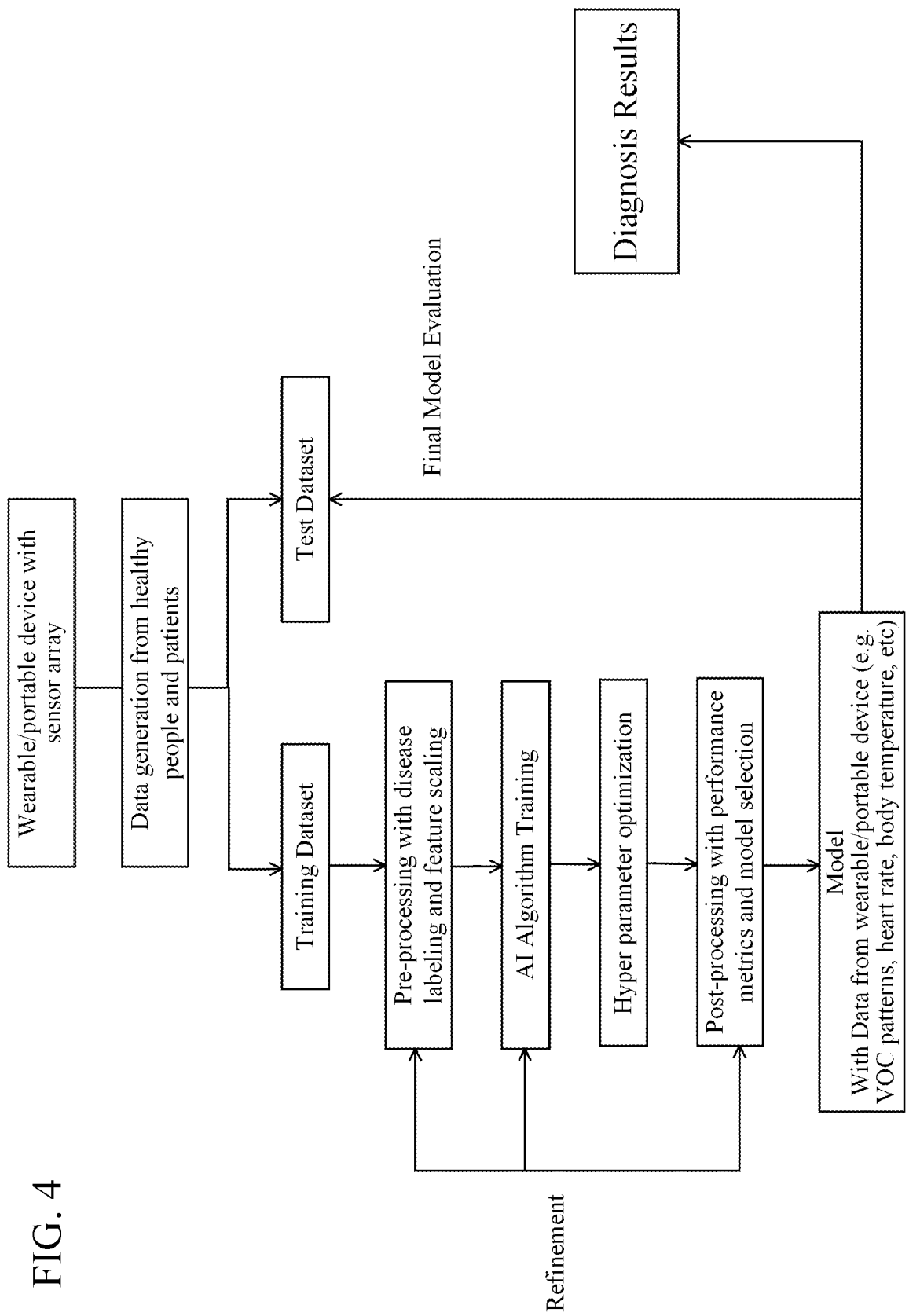
FIG. 4 shows a process for building a model/classifier and using it to diagnose health conditions.

FIG. 4 is a flow chart showing the method for diagnosing diseases using the VOC data. First, a sufficient number of data samples from both healthy people and patients with known health conditions, i.e., a discovery cohort, are collected. The data samples include VOC data patterns or VOC data patterns and vital signs. Mathematical algorithms are used to train the data, identify the distinct pattern between healthy controls and patients, and generalize a classifier. The mathematical algorithm can be one or more of PCA, Naïve Bayes, support vector machine (SVM), multi-layer perception (MLP), generalized regression neural network (GRNN), fuzzy inference systems (FIS), self-organizing map (SOM), radial bias function (RBF), genetic algorithms (GAS), neuro-fuzzy systems (NFS), adaptive resonance theory (ART), partial least squares (PLS), multiple linear regression (MLR), principal component regression (PCR), discriminant function analysis (DFA), linear discriminant analysis (LDA), cluster analysis, and nearest neighbor. The classifier is a mathematical equation of a partial of vital signs and/or skin-VOCs to predict different diseases.

In the discovery cohort, a portion of the data is randomly assigned into a training set while the remainder in the test set. The optimal classifiers are developed in the training set using the test set. The values of the area under the ROC curve (AUC) in patients are determined. Then, the sensitivity, specificity, positive predictive value (PPV), and negative predictive value (NPV), and accuracy of the device for both training and test groups are evaluated. For example, a 5-fold cross-validation (randomly select one-fold of samples for the testing, the remaining 4 folds for training) can be applied to calculate the classification performance of the training set.

Once the mathematical model (aka classifier) is developed, one and more independent clinical cohorts are collected to validate the model. In the process, the model parameters are refined and the patients may further be stratified into subtypes that use different set of parameters.

After model validation and refinement, users can input into the model/classifier VOC data or vital signs or both from a subject and the model may predict a health condition.

Some embodiments of the device are capable to measure skin and body temperature (−15° C. to 45° C.), heart rate, humidity (0-99%), and a variety of concentrations of VOCs. The VOC detection limit may range from 0.1 ppb to 5000 ppm, e.g., 0.1 ppb-1 ppb, 1 ppb-5 ppb, 5 ppb-10 ppb, 10 ppb-50 ppb, 50 ppb-100 ppb, 100 ppb-200 ppb, 200 ppb-300 ppb, 300 ppb-500 ppb, 500 ppb-1 ppm, 1 ppm-2 ppm, 2 ppm-5 ppm, 5 ppm-10 ppm, 10 ppm-100 ppm, 100 ppm-200 ppm, 200 ppm-500 ppm, 500 ppm-1000 ppm, 1000 ppm-2000 ppm, and 2000 ppm-5000 ppm. Other embodiments may have an audible alarm, an inaudible alarm, color alert, or other visualization when the skin emanated VOC patterns are detected.

The methods, gas sensors, and devices disclosed herein can detect the composition VOCs emanated from the subject. In some cases, the devices may be capable of detecting VOCs at a concentration of 5000 ppm or less, 4000 ppm or less, 3000 ppm or less, 2000 ppm or less, 1000 ppm or less, 500 ppm or less, 250 ppm or less, 100 ppm or less, 50 ppm or less, 10 ppm or less, 1 ppm or less, 800 parts per billion (ppb) or less, 600 ppb or less, 500 ppb or less, 400 ppb or less, 200 ppb or less, 100 ppb or less, 80 ppb or less, 60 ppb or less, 40 ppb or less, 20 ppb or less, 10 ppb or less, or 1 ppb or less, of VOCs in gas mixtures.

In some cases, the methods, sensors, and devices may be configured to have a limit of detection of 5000 ppm or less of gases in gas mixtures. The "limit of detection" (or "the detection limit") means the lowest quantity of a substance that can be distinguished from the absence of that substance, i.e., a blank value. In certain cases, the gas sensor or device are configured to have a limit of detection of 1000 ppm or less, 500 ppm or less, such as 400 ppm or less, including 300 ppm or less, 200 ppm or less, 100 ppm or less, 75 ppm or less, 50 ppm or less, 25 ppm or less, 20 ppm or less, 15 ppm or less, 10 ppm or less, 5 ppm or less, 1 ppm or less, 500 ppb or less, 100 ppb or less, 50 ppb or less, 10 ppb or less, or 1 ppb or less. In certain cases, the gas sensor or device is configured to have a limit of detection of 1 ppm or less. In certain cases, the gas sensor or device is configured to detect at least 1 ppb, at least 10 ppb, at least 50 ppb, at least 100 ppb, at least 500 ppb, at least 1 ppm, at least 5 ppm, at least 10 ppm, at least 15, ppm, at least 20 ppm, at least 25 ppm, at least 50 ppm, at least 75 ppm, at least 100 ppm, or at least 200 ppm of the VOCs.

The non-invasive device may be stand-alone, and/or incorporated in (e.g., as a part of) and/or interoperable with an interactive mobile devices, instruments, or applications with Internet of Things (IoT) features. The non-invasive device may be a part of a system that also include a host device. For example, the non-invasive device is electrically, signally, or physically attached to a host device. Electrically integrated may include connecting using a power cable or a data cable. Signally integrated may include wireless communication as well as through a data cable. Further physically integrated may include attachment by a fixture, such as a bracket, a holder, an adhesive tape or patch.

The host device can be one of the following: wearable device, wearable watch, wearable band, glucose patch, wearable clothing, wearable jewelry, head-mounted display, smart ring, smart glasses, smart card, smart shoe, e-textile, smart connected products, wearable computer, healthcare device, medical device, hospital stretcher, defibrillator, anesthesia machine, patient monitor, sterilizer, Electrocardiogram machine, surgical table, blanket and fluid warmer, electrosurgical unit, bandage, heating pad, prosthetic device, artificial arm, artificial leg, orthotic device, leg brace, shoe insert, wound dressing system, transparent films dressing, foams dressing, hydrocolloids dressing, alginates dressing, composites dressing, cloth dressing, antimicrobial dressings, low adherent dressings, semipermeable films dressing, gauze sponge dressing, gauze bandage dressing, non-adherent pads, non-adherent wet dressings, calcium alginates dressing, hydrogel dressing, hypothermia bag, gas chromatography (GC), mass spectrometry, gas chromatography-mass spectrometry (GC-MS), infrared spectroscopy.

In some embodiments, the devices are intelligent. For example, the devices may be configured to self-calibrate. E.g., the calibration may be performed based on reference information, e.g., baseline values, specific for an individual user.

The devices may be configured to digitally read VOCs concentrations. The devices may convert signals from one form to another. For example, the devices may convert analog signals into digital signals, and/or convert digital signals into measurements of energy consumption and/or metabolic profiles of the user subject.

The devices may transfer data wirelessly, e.g., via internet, Bluetooth, Bluetooth low energy (BLE), or a combination thereof. The devices may be configured to connect with smartphones or computers (e.g., laptops) to visualize, monitor, analyze the onset and progression of the diseases, drug treatment, metabolic profiles and physiological statuses, or a combination thereof of a subject using (e.g., wearing) the devices.

The VOCs released from a subject, may release from skin of a palm, finger, ear, nose, face, eye, arm, leg, chest, breast, back, abdomen, and/or or foot, comprises at least one or two or more of chemical vapors, such as aldehydes, alcohols, ketones, acids, sulphur containing compounds, esters, hydrocarbons and nitrogen containing compounds, such as propene, acetaldehyde, ethanol, acetonitrile, (E)-2-Butene, (Z)-2-butene, 2-propenal, n-propanal, Acetone, 2-propanol, dimethyl sulfide, 1-pentene, isoprene, n-Pentane, 1,3-Dioxolane, 2-methyl-2-propenal, 2-methyl-Propanal, 3-Buten-2-one, 2-methyl Furan, n-Butanal, 2-Butanone, 3-methyl Furan, Ethyl Acetate, 2-Butenal, 2-methyl-1,3-Dioxolane, 2-methyl-2-Pentene, 2,3-dimethyl-2-Butene, (E)-2-Methyl-1,3-pentadiene, (Z)-2-Methyl-1,3-pentadiene, 3-methyl-Butanal, 2-methyl-Butanal, Isopropyl acetate, 2-Pentanone, 2,5-dimethyl Furan, allyl methyl Sulfide, n-Pentanal, 3-methyl-2-Butenal, 1-Heptene, 2-Heptene, n-Heptane, 2-ethyl-Butanal, 4-Methyl-3-penten-2-one, Isobutyl acetate, 2-Hexanone, n-Hexanal, γ-Butyrolactone, n-Butyl acetate, (E)-2-Hexenal, 1-Octene, n-Octane, 2-Heptanone, n-Heptanal, Benzaldehyde, 1-Nonene, n-Nonane, 6-Methyl-5-hepten-2-one, 2-pentyl-Furan, b-Pinene, n-Octanal, p-Cymene, DL-Limonene, Styrene, Eucalyptol, n-Nonanal, 2-Ethylhexanol, 3-Methylhexane, Butyraldehyde, Ethylbenzene, Ethyl butanoate, toluene, undecane, $H_2O$, CO, NO, $N_2O$, $NO_2$, ammonia, Acetophenone, 4-methylphenol, Dodecane, Dimethyl pyrazine, 2-Pentanol, 2-butanol, 2-pentene, 2-methylbutyl isobutyrate, 2-methoxy-5-methylthiophene, amyl isovalerate; 2-methylbutyl 2-methylbutyrate, 6-tridecane, 3-methyl 1H-pyrrole, 2-methyl-3-(2-propenyl)-pyrazine, 2,3-dimethyl-5-isopentylpyrazine, Methyl thiolacetate, Methyl thiocyanate, Hydrogen cyanide, 2-aminoacetophenone, 1-undecene, Formaldehyde, Dimethyl ether, carbon dioxide, pentafluoropropionamide, Methyl cyclohexane, 2-methylbutanol, N-propyl acetate, Butanal, 2,5-dimethyltetrahydrofuran, Carbon disulfide, methyl propanoate, methyl butanoate, 6-methyl-5-hepten-2-one, 2,5-dimethylpyrazine, Hydrogen sulfide, Propanol, Indole, 1,1,2,2-tetrachloroethane, Butanol, 2-tridecenone, 3-hydroxy-2-butanone, 1-hydroxy-2-propanone, 3-nitro-benzenesulfonic acid, Isobutyric acid, methyl ester, 1,2-dimethyl-benzene, 2-ethyl-1-hexanol, Isopentyl 3-methylbutanoate, 2,4-dinitro-benzenesulfonic acid, Decanal, 2-methyl-1-propanol, 2-phenylethanol, 1,4-dichlorobenzene, 2-methylbutanoic acid, methyl mercaptan, 2-nonanone, 3-methyl-1-butanol, 3-methylbutanoic acid, dimethyl trisulfide, dimethyl disulfide, acetic acid.

The device can be applied in many diseases and disorders, such as infections and inflammatory disorders, Pancreatitis, Pneumonia, Sepsis/Septic shock, hypoxia, flu, asthma, COVID-19, virus, Fungi, bacteria, Hypoglycemia, diabetes, cancer, Melanoma in skin cancer, colorectal cancer, lung cancer, bladder cancer, breast cancer, colon cancer, head and neck cancer, ovarian cancer, prostate cancer, kidney cancer, gastric cancer, uterine cancer, liver cancer, Endocrine and Metabolic disease, Addison's Disease, Hyperaldosteronism, Hyperlipidemia, Gastrointestinal and Hepatic disease, Crohn's disease, Nonalcoholic steatohepatitis Peptic ulcer disease, Neurologic disease, Seizure, Sleep apnea, Psychiatric disease, Alzheimer's disease, Autism spectrum disorder, ulcerative colitis, irritable bowel syndrome, metabolic disorder, multiple sclerosis, pulmonary arterial hypertension, pre-eclampsia, chronic kidney disease, Epileptic patients, Parkinson's disease, idiopathic Parkinson's, atypical Parkinsonism, and hyper/hypo glycaemia, ketone, fat burning, human performance, and ketoacidosis, etc.

Data collected by the device can be transmitted wirelessly through WIFI or Bluetooth to a server and shared with medical professionals in real-time to realize more accurate and appropriate treatment. The device senses the presence of diseases and human performance continuously.

EXAMPLES

Example 1

Figure 5:
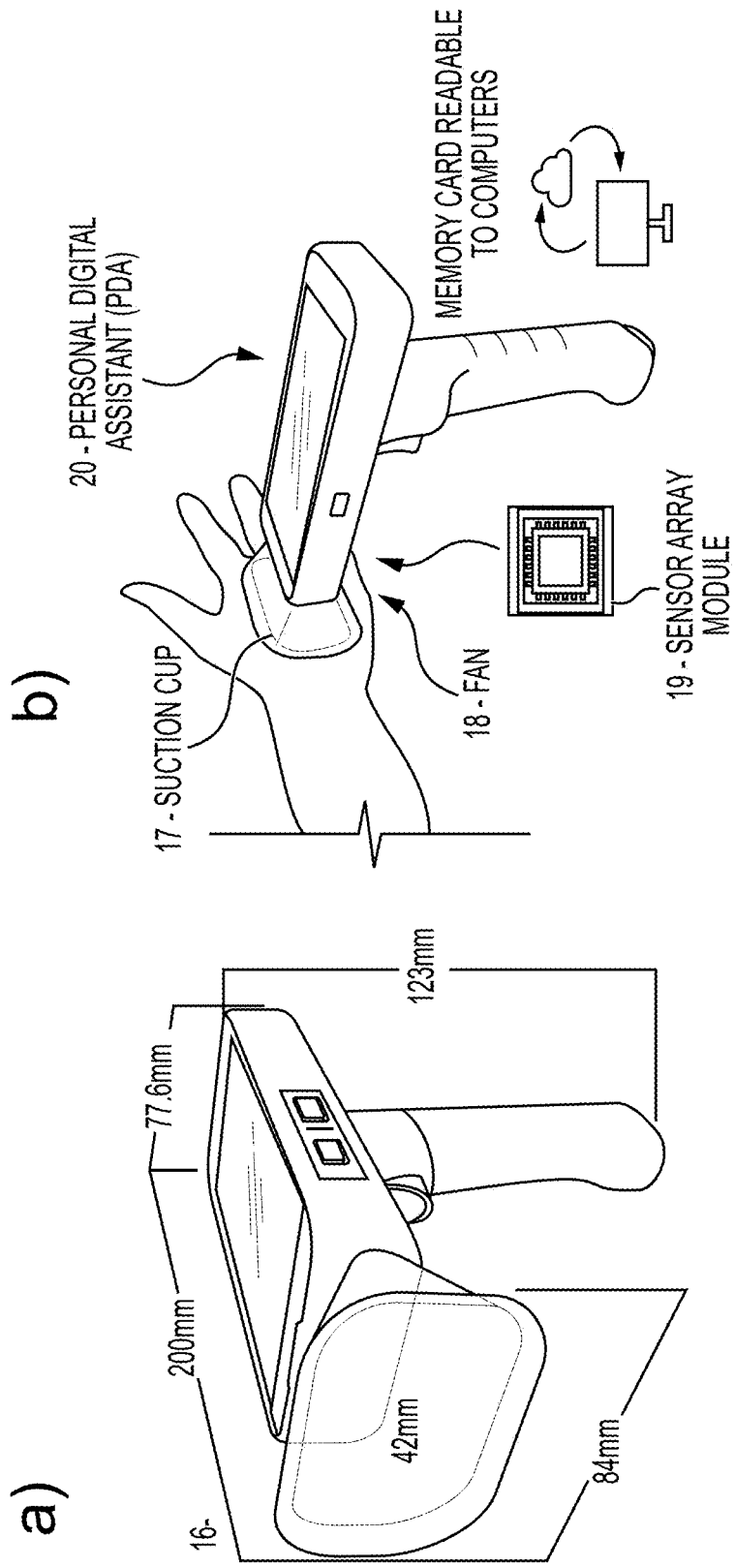
FIG. 5 illustrates a portable device and its application.

FIG. 5 shows an exemplary portable device and how it may be used. The portable device 16 has a disposable suction cup 17 adapted to cover a surface, a fan 18 adapted to create a slight vacuum in the suction cup 17, at least one sensor array module 19, and a Personal Digital Assistant (PDA) interface 20 that a user may interact with. The sensor array module 19 is similar to the one described in FIG. 2. It contains at least one sensor array, at least one sensor signal processing circuit, at least one switch channel circuit, at least one analog-to-digital converter, at least one Micro-controller Unit, at least one power management system, and at least one USB interface. The MCU collects digital signals from ADCs and transmits it to the System-On-Chip (SOC) on the PDA 20.

In Example 1, the sensor array module 19 is attached to the suction cup 17. Employing the suction cup 17 reduces interference from the environment, e.g., hand sweat, dirt, temperature changes. To increase the sensitivity of the device, a fan 18 is used to create a slight negative pressure in the suction cup so that VOCs emanated from the palm mostly enter the portable device.

The PDA 20 system contains SOC with 1-1/wireless/USB communication capability, central processing unit (CPU), memory, and an OLED or LCD screen. The data can be transferred by USB cable or wireless communication to a terminal (e.g., a PC) or cloud database. The PDA runs an APP as the human-computer interface, test data collection, and data transfer for further analysis. The test results may be shown on the PDA as number or, more visibly, using color coded messages. Table 1 shows the correlation between detection level and color code. For example, when data is over 5.0, the PDA alters the user by showing a red message.

TABLE 1

| Color | Data | Meaning |
|---|---|---|
| | PDA display for indications | |
| White | 0 | Blank |
| Green | 0.1-2.9 | Health |
| Yellow | 3-4.9 | Continue Testing |
| Red | Over 5.0 | Alert |

Variations of the device 16 are multiple. For example, the device may not have a fan to pull vacuum and rely on diffusion. Further, the device may be handheld or stationary. In some embodiments, the device has a pressure sensor that can detect a change in the ambient pressure and turns on the device from a standby mode to a work mode. As such, when a subject's body part (e.g., hand, forehead) covers the suction cup 17, the change in pressure may turn the device to a work mode. In another embodiment, the device may turn off automatically when the data is sufficient for readout or after a predetermined period of time in the standby mode. The device may have a manual entry option through which a user can manually set a during for test, e.g., for 0.001-30 minutes.

Figure 6A:
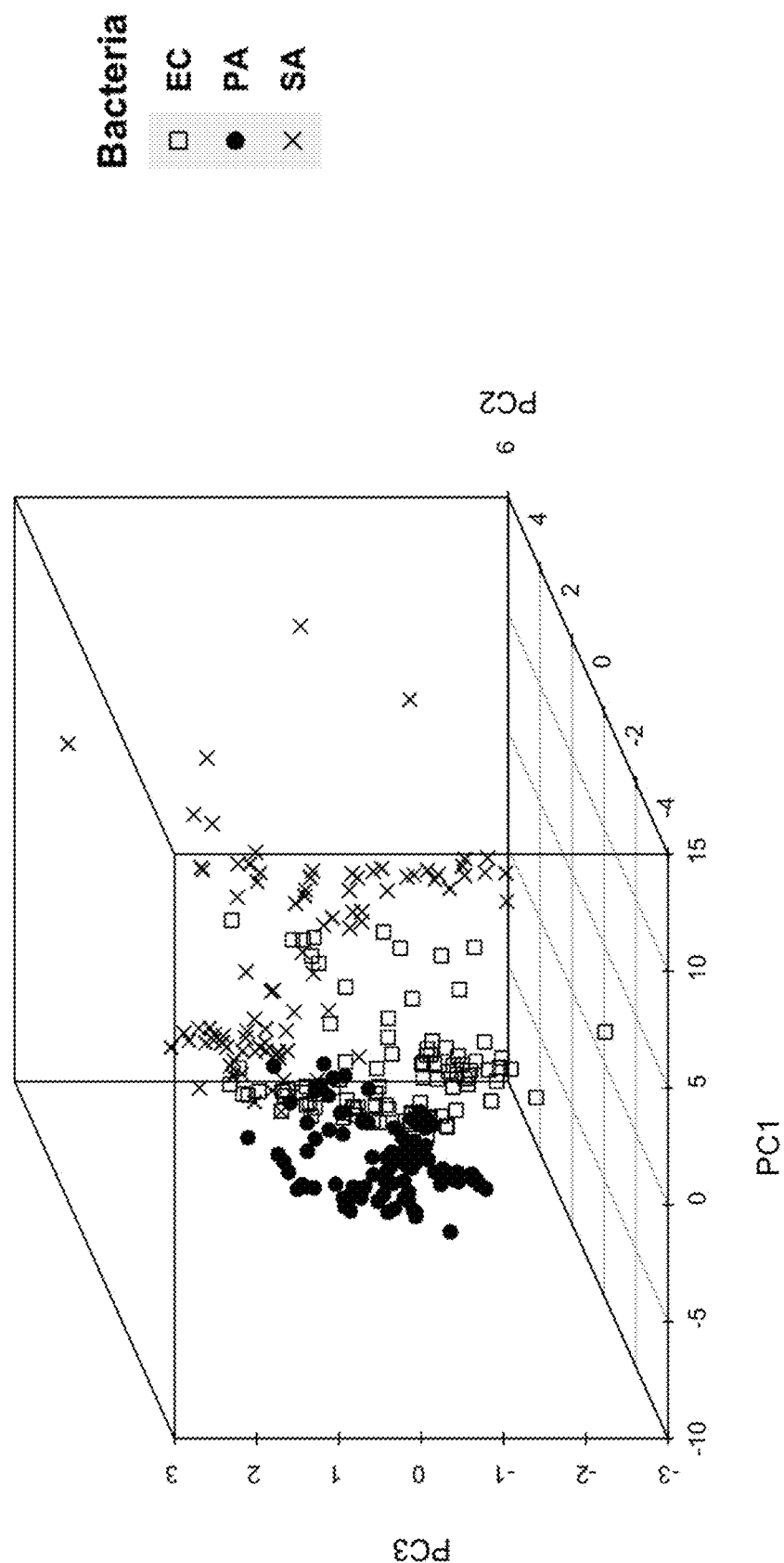
FIGS. 6a-6b shows the analysis of VOCs patterns of three bacteria—*Escherichia coli* (*E. coli*), *Pseudomonas aeruginosa* (PA), and *Staphylococcus aureus* (SA)—in the wound infection using the device of FIG. 5.
Figure 6B:
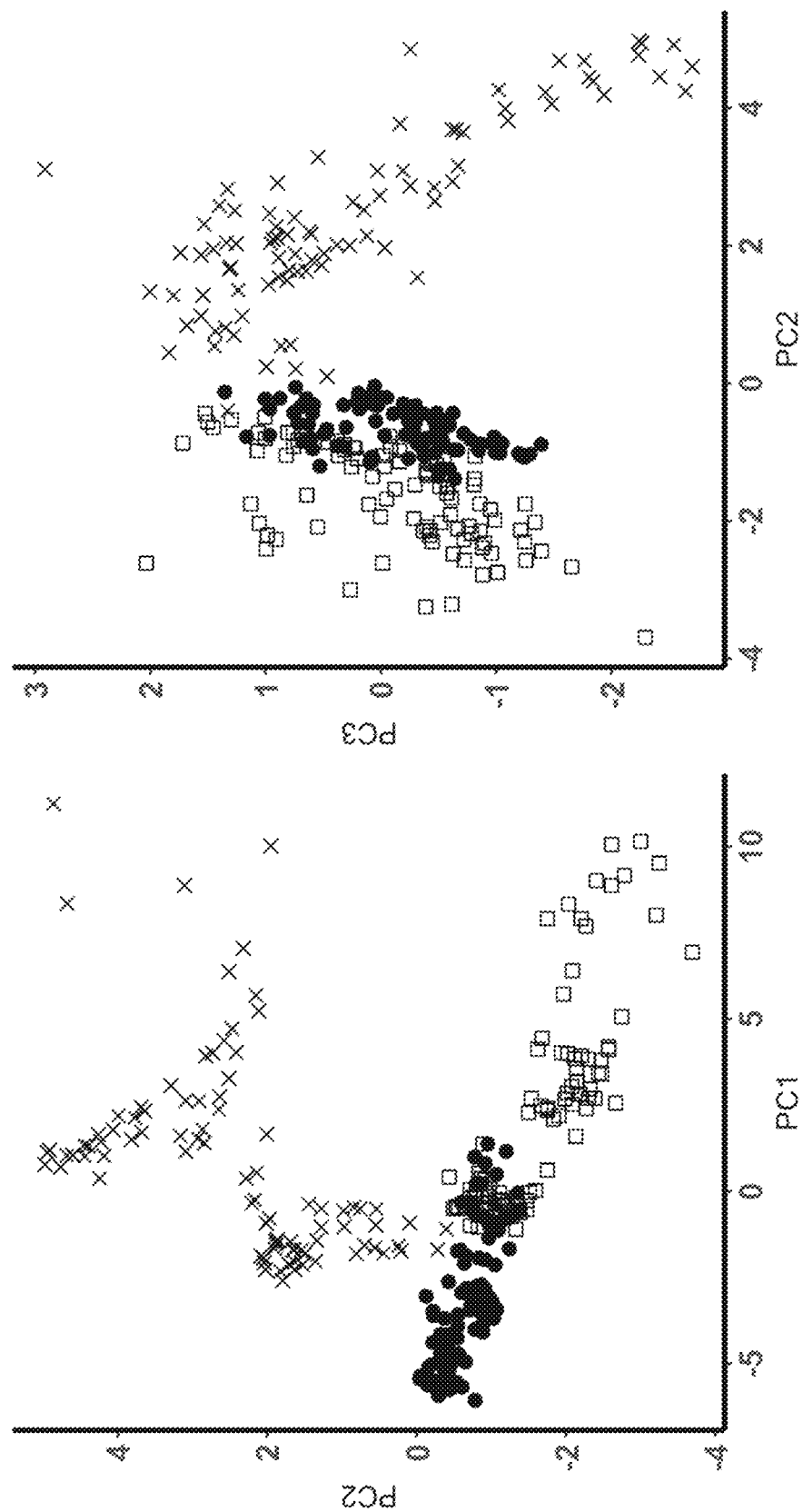

FIGS. 6a-6b show the analysis of VOCs patterns detected using the portable device 16 for monitoring the growth of three bacteria—*Escherichia coli* (*E. coli*), *Pseudomonas aeruginosa* (PA), and *Staphylococcus aureus* (SA)—in the wound infection. Each dot represents the device readout of a VOC in a principal space.

Example 2

Figure 7:
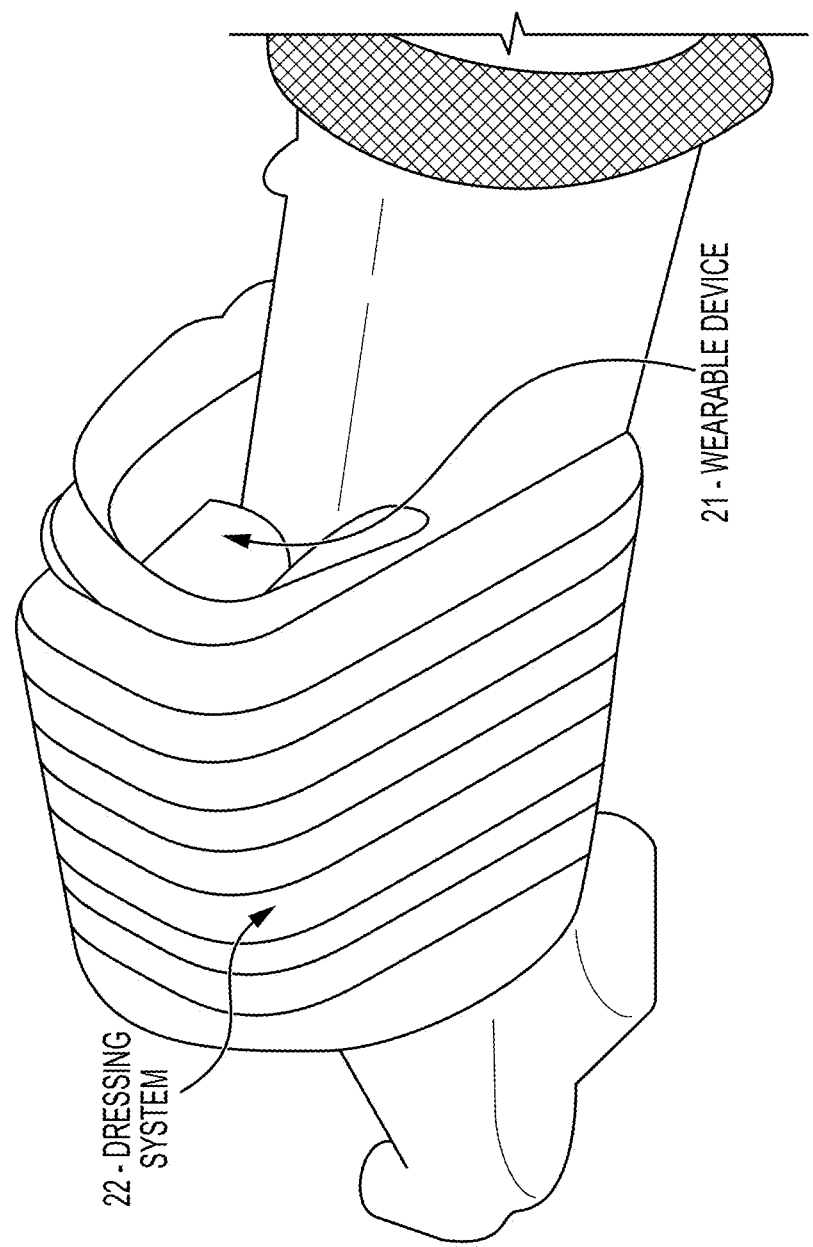
FIG. 7 illustrates an application of a wearable device of the current disclosure that is integrated into a dressing system for real-time monitoring wound infection.
Figure 8A:
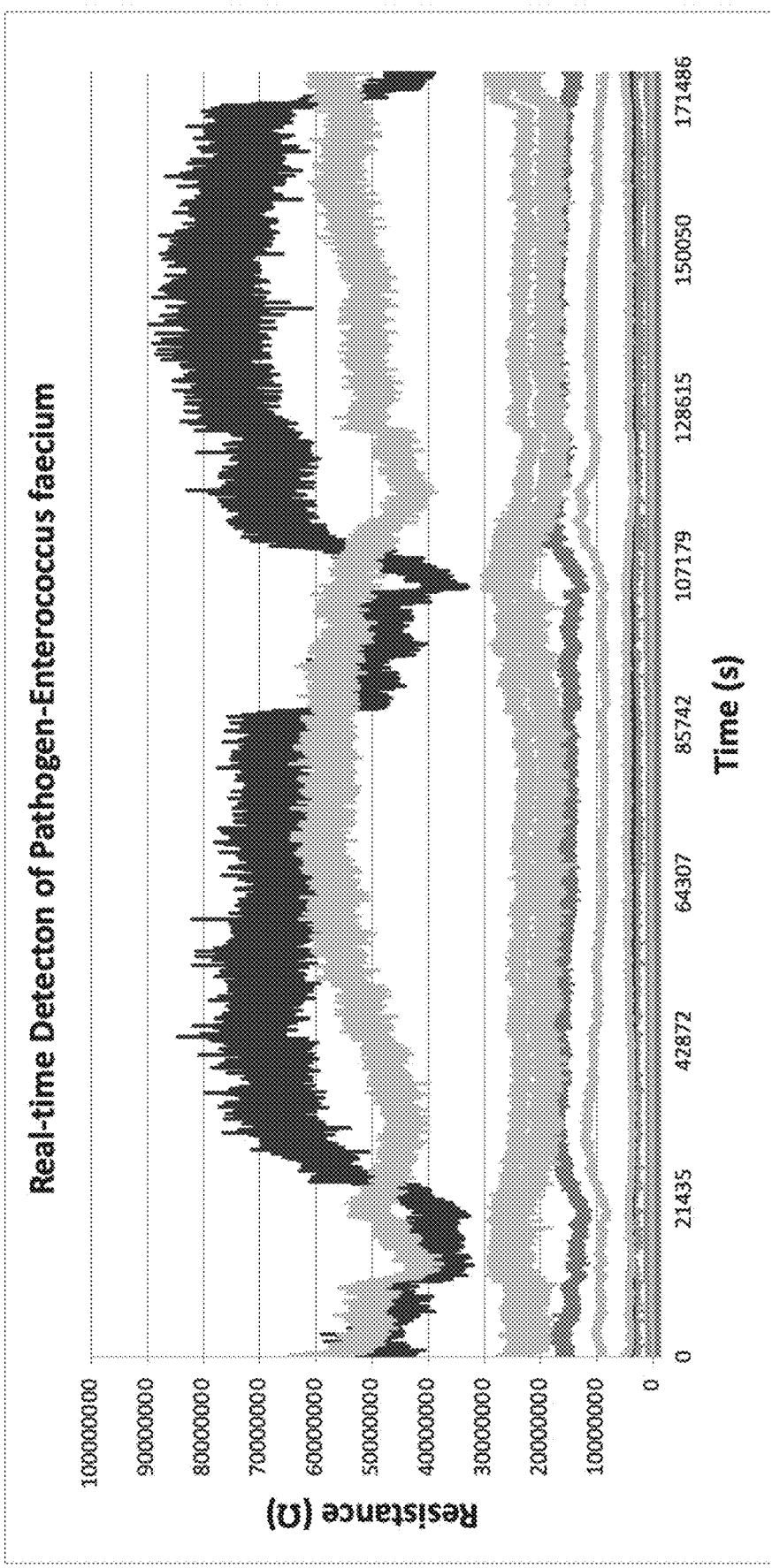
FIGS. 8a-8d show VOCs pattern of pathogens due to wound infection detected by the wearable device of FIG. 7.
Figure 8B:
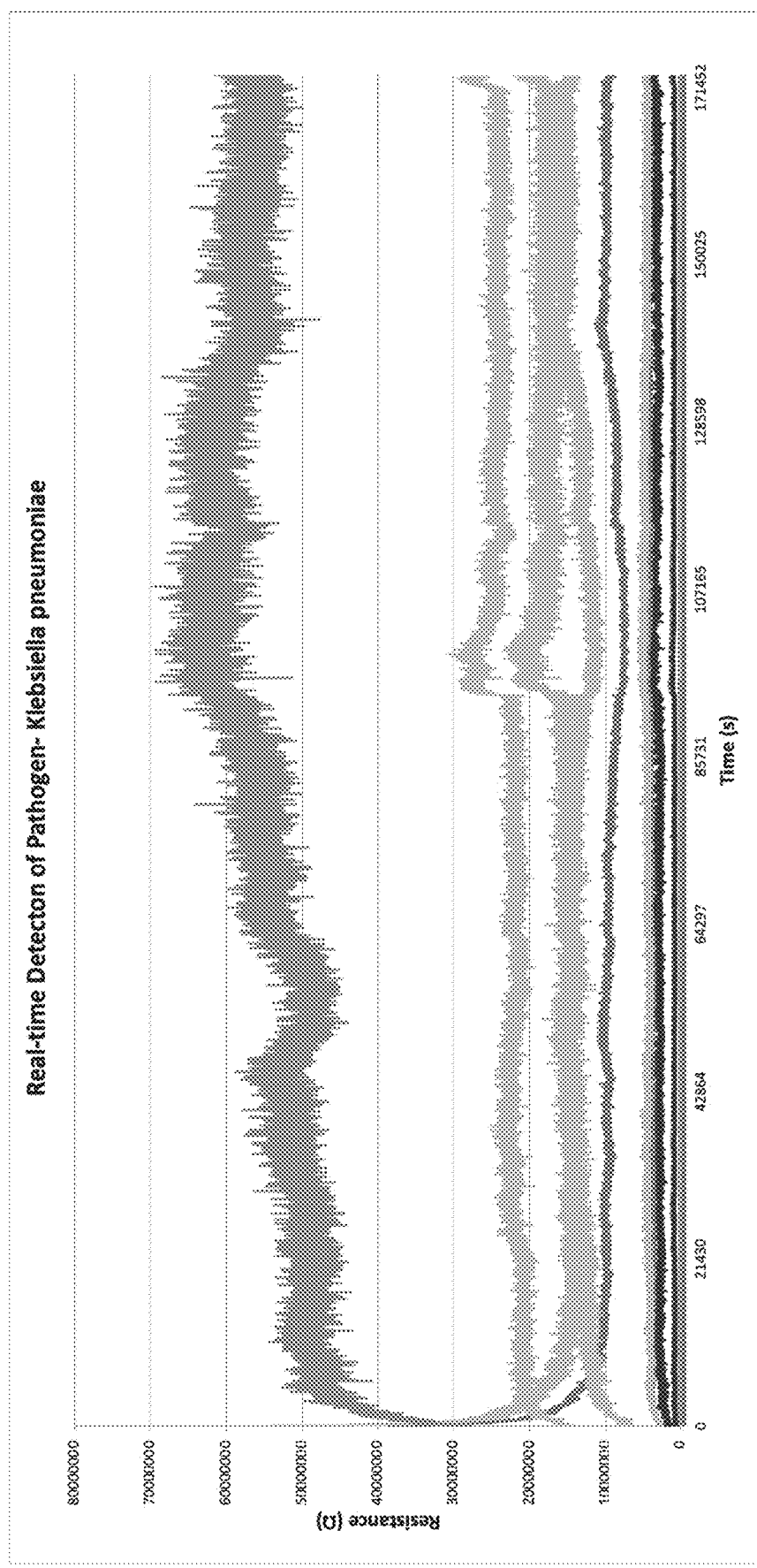
Figure 8C:
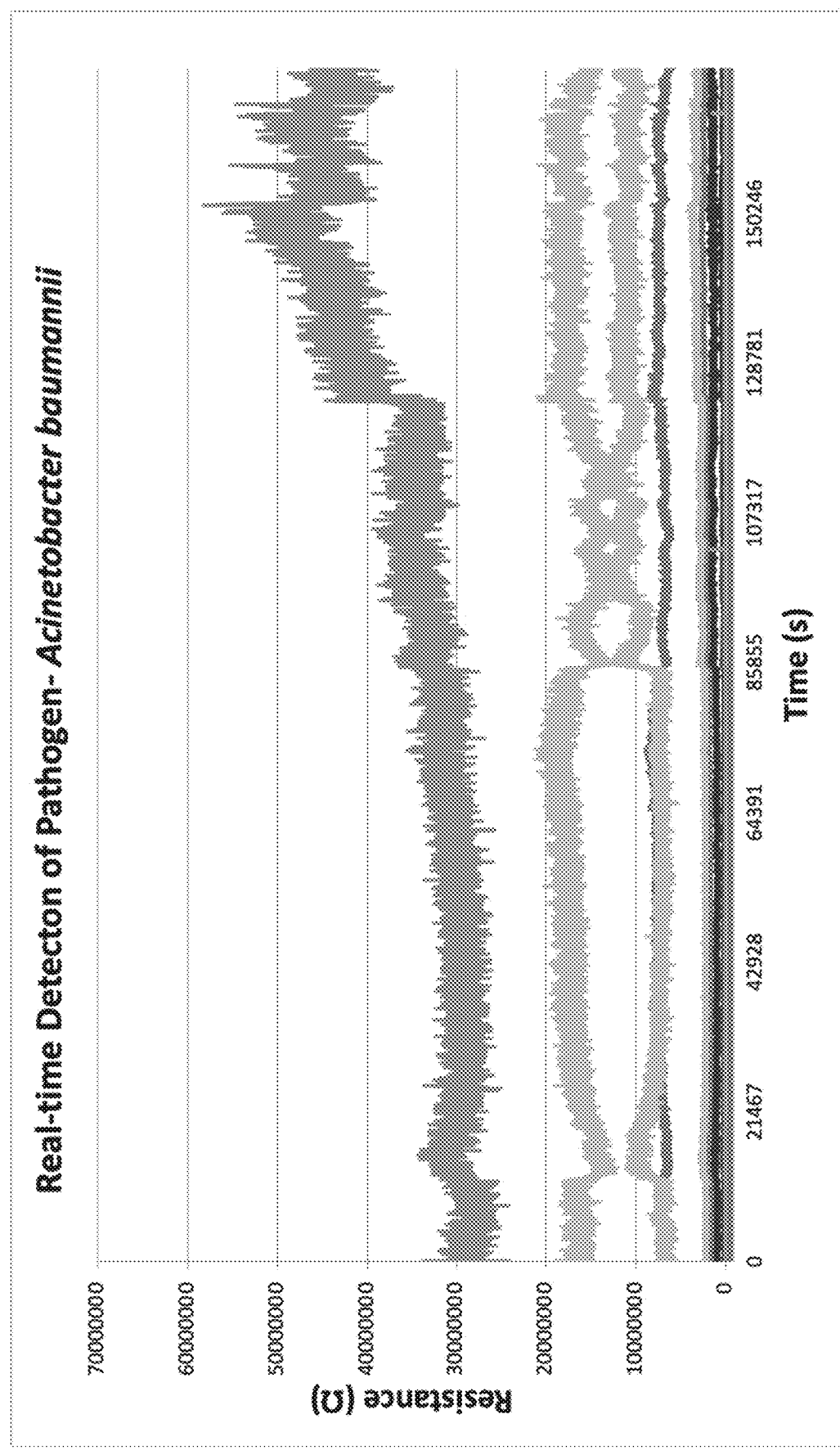
Figure 8D:
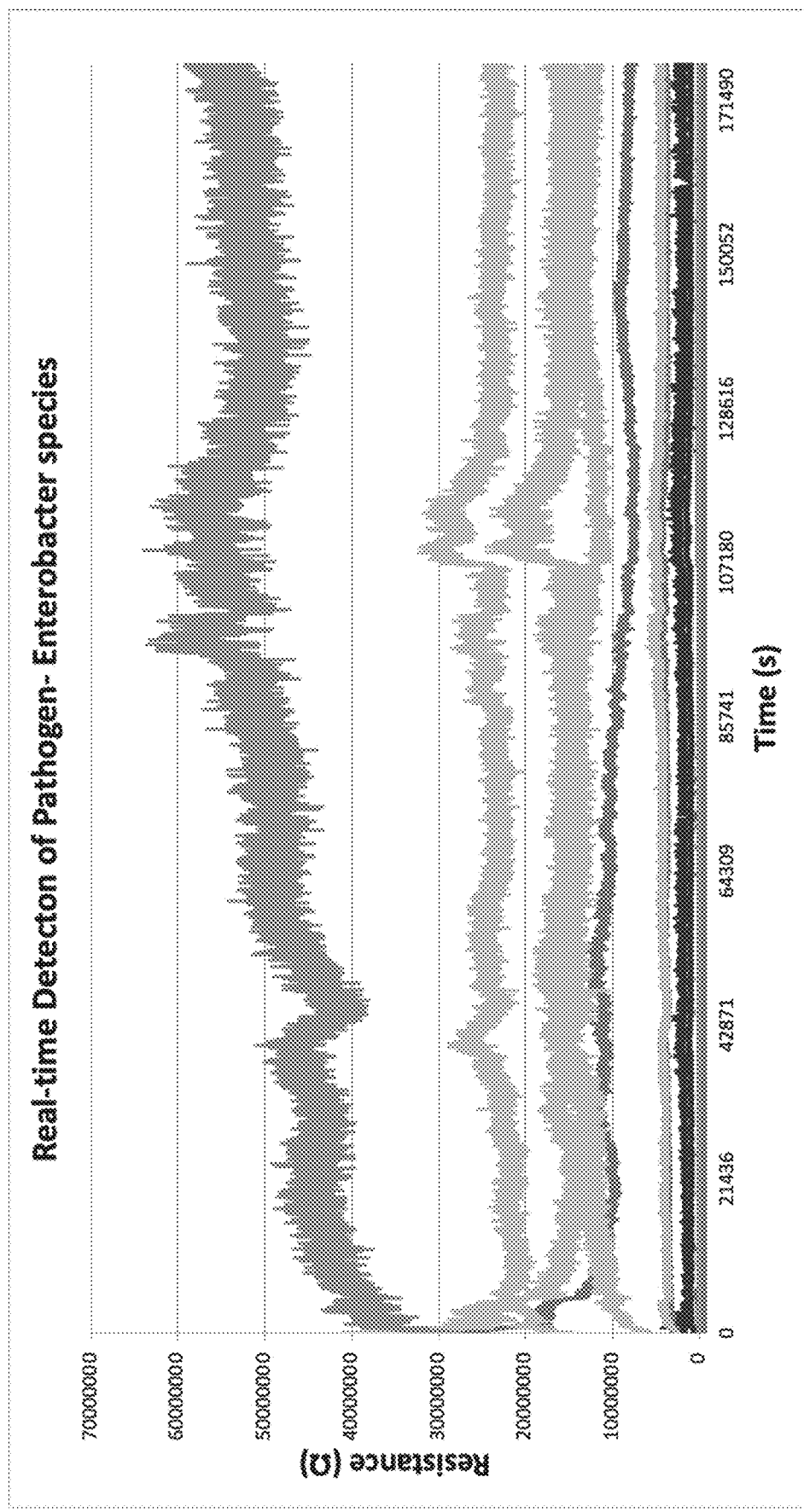

FIG. 7 illustrates one embodiment of a wearable device 21 for real-time monitoring wound infection. In this example, the wearable device 21 is integrated into a dressing system 22 for detection, identification and monitoring of bacteria that cause wound infection. The dressing system cover system 22 cover the wound and the wearable device 21 is place over or in vicinity of the wound.

Similar to what has been described with respect to FIG. 1 or 2, the wearable device 21 has a sensor array, a sensor signal processing circuit (voltage divider circuit), a 4-channel switching circuit, four 14-bit analog-to-digital converters (ADCs), a Micro-controller Unit (MCU), and an USB interface. The sensor array contains a 3×3 array with 9 different gas sensors and one physiological sensor (skin temperature). Each of the 9 sensors has different nanostructured multiple-component metal oxides or different amount (e.g., concentration) of nanostructured multiple-component metal oxides make up or composition. The voltage divider circuit is used to process changes in properties (e.g., voltage changes, resistance changes, impedance changes, combinations of these and the like) in each sensor in the sensor array. To ensure the ADC accuracy, 4 ADCs and a 4-channel switching circuit is used for data acquisition and digitalization. The MCU collects digital signals from ADCs and transmits it to the system. The data is transferred wirelessly to a PC and cloud database. The controller unit comprises an 8-bit microcontroller with Wi-Fi communication module, Liquid Crystal Display (LCD), Capacitive Touch Panel (CTP), and "on-off switch". The communication unit sends and receives radio waves at a certain frequency. The communication and power supply module (rechargeable battery) contains the power source and is also responsible for data acquisition and transmission and can be connected with a PC through the Wi-Fi communication module. CTP and LCD provide the capability of human interaction interface.

The wearable device 21 continuously detects VOCs emanated from ESKAPEE pathogens (*Enterococcus faecium*, *Staphylococcus aureus*, *Klebsiella pneumoniae*, *Acinetobacter baumannii*, *Pseudomonas aeruginosa*, *Enterobacter species*, and *Escherichia coli*) for 36 hours. Sixteen sensors had complete profiles for all the experiments.

FIGS. 8a-8d present the measurement results by the 16 sensors of 4 analytes (*Enterococcus faecium*, *Klebsiella pneumoniae*, *Acinetobacter baumannii*, *Enterobacter* species) within 36 hours. Each ESKAPEE pathogen can be discriminated by unique patterns within the first 12 hours. To advance AI-powered detection, a 9-class Support Vector Machine (SVM) classifier was constructed to discern the sensor profiles of bacterial strains. To avoid artifacts of overfitting, the data set from 75% of the samples, sampled every 0.5 hour from the sensor profiles, was used as a training set to train the SVM model. The remaining 25% of the sample data was used as the test set to validate the SVM model. The average accuracy was very high for each bacterium, and the overall accuracy reached 97.08%, as shown in Table 2.

TABLE 2

| Bacteria | ESKAPEE pathogens monitoring using wearable device | | | | |
|---|---|---|---|---|---|
| | Acinetobacter baumannii | Enterobacter species | Enterococcus faecium | Klebsiella pneumoniae | Mean |
| Accuracy | 99.26% | 98.52% | 94.57% | 99.92% | 97.08% |

Example 3

Figure 9:
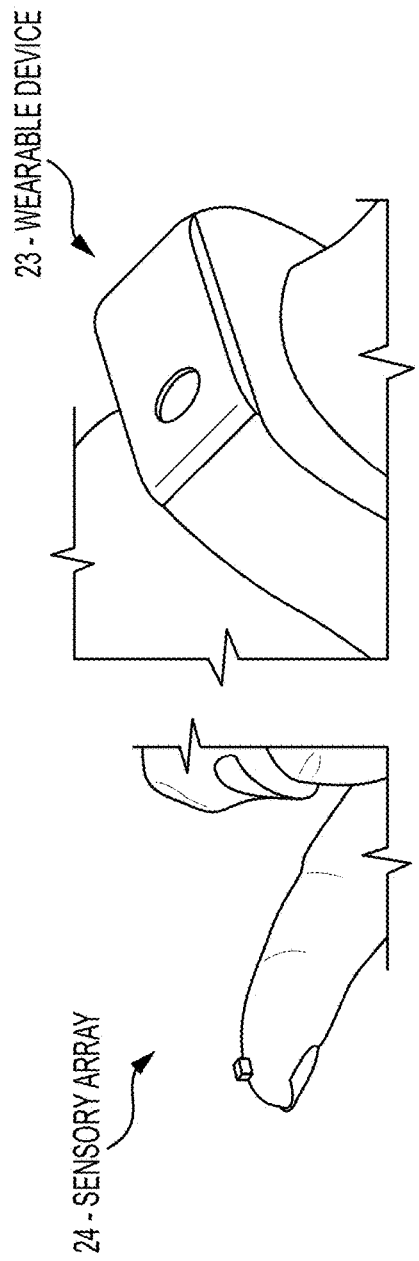
FIG. 9 illustrates an exemplary wearable device that monitors real-time skin emanated VOCs.
Figure 9:
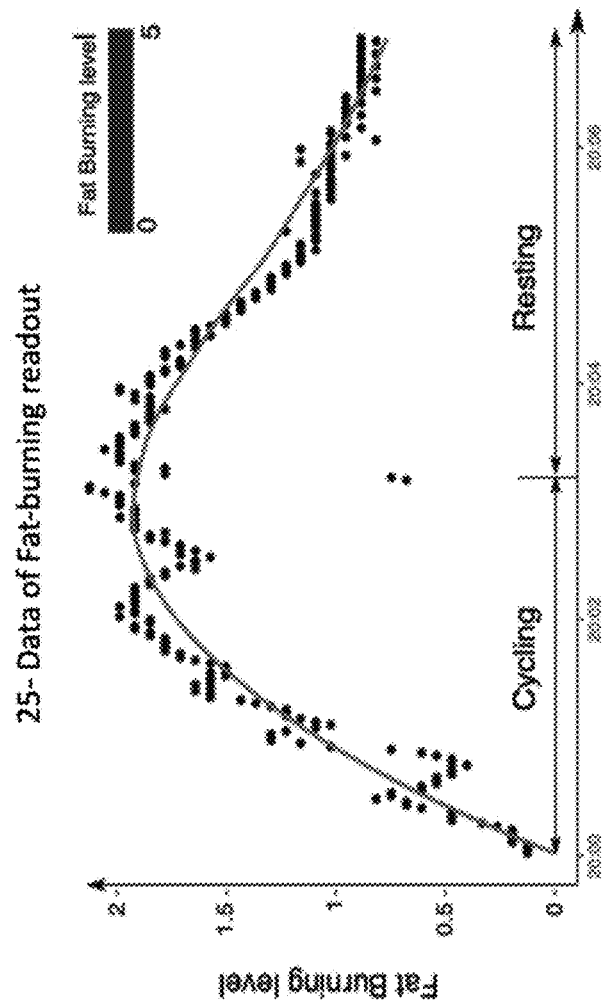

FIG. 9 illustrates a further embodiment of a wearable device 23 for real-time monitoring a person's performance during a fat-burning exercise. In this illustrative example, the wearable device 23 is a wearable wristwatch. The wearable device 23 comprises a sensor array 24, sensor signal processing circuit (voltage divider circuit), a 4-channel switching circuit, an analog-to-digital converter (ADCs), a Micro-controller Unit (MCU), USB interface. The sensor array 24 comprises 2 different gas sensors and one physiological sensor (heart rate). Each of the 2 sensors has different nanostructured multiple-component metal oxides or different amount (e.g., concentration) of nanostructured multiple-component metal oxides make up or composition. The voltage divider circuit is used to process an electrical change (e.g., voltage changes, resistance changes, impedance changes, combinations of these and the like) in each sensor of the sensor array 24. The MCU collects digital signals from ADCs and transmits it to the system. Data 25 was analyzed using artificial intelligence algorithms and transferred by wirelessly to a PC and/or cloud database. The controller unit comprises an 8-bit microcontroller with Wi-Fi communication module, Liquid Crystal Display (LCD), Capacitive Touch Panel (CTP), and "on-off switch". The communication and power supply module (e.g., a rechargeable battery) contains the power source and is also responsible for data acquisition and transmission and can be connected with a PC through the Wi-Fi communication module. CTP and/or LCD provide the capability of human interaction interface.

The wearable device 23 monitors acetone emanated from the person before, during, and after exercise. The data set 25 shows the skin-emanated acetone level form a person who performed three times 3-min cycling exercises on an ergometer at moderate intensity and then rested for 4 min. Prior to and throughout the testing course, the person fasted to minimize the influence of food intake on the acetone level. The data set 25 clearly shows the relative change from the initial value to evaluate the effect of the exercise.

Although the foregoing embodiments have been described in some detail for purposes of clarity of understanding, the disclosure is not limited to the details provided. Additional variations of the device and methods of implementation according to the current disclosure are available. The disclosed embodiments are illustrative and not restrictive.

I claim:

1. A device for monitoring one or more health conditions of a subject in need thereof, comprising:
a housing,
a plurality of sensor arrays, a pressure sensor, a fan having a standby mode and a work mode,
and one or more processors disposed in the housing, wherein:
the plurality of sensor arrays comprises one or more VOC sensors adapted to change one or more properties selected from resistance, impedance, and a combination thereof, upon exposure to a plurality of volatile organic compounds (VOCs) emitted from a skin surface of the subject, and to generate electrical signals corresponding to the changes in the one or more properties;
the one or more processors are configured to process the electrical signals from the plurality of sensors, generating data, and diagnosing one or more health conditions of the subject by correlating the generated data with the one or more health conditions;
the housing has an inlet in the form of one or more openings, each of the one or more openings is connected to at least one of the plurality of sensor arrays through a conduit;
an interface for outputting data and/or receiving input commands;
a fixing member installed at an inlet of the device for placing the device to the skin surface of the subject, wherein the fixing member has a shape of a cup configured to enclose a portion of the skin surface of the subject; and
during operation, the pressure sensor detects a pressure change and causes the fan to switch between the work mode and the standby mode.

2. The device according to claim 1, wherein the one or more VOCs is selected from aldehydes, alcohols, ketones, acids, Sulphur containing compounds, esters, hydrocarbons and nitrogen containing compounds, propene, acetaldehyde, ethanol, acetonitrile, (E)-2-Butene, (Z)-2-butene, 2-propenal, n-propanal, Acetone, 2-propanol, dimethyl sulfide, 1-pentene, isoprene, n-Pentane, 1,3-Dioxolane, 2-methyl-2-propenal, 2-methyl-Propanal, 3-Buten-2-one, 2-methyl Furan, n-Butanal, 2-Butanone, 3-methyl Furan, Ethyl Acetate, 2-Butenal, 2-methyl-1,3-Dioxolane, 2-methyl-2-Pentene, 2,3-dimethyl-2-Butene, (E)-2-Methyl-1,3-pentadiene, (Z)-2-Methyl-1,3-pentadiene, 3-methyl-Butanal, 2-methyl-Butanal, Isopropyl acetate, 2-Pentanone, 2,5-dimethyl Furan, allyl methyl Sulfide, n-Pentanal, 3-methyl-2-Butenal, 1-Heptene, 2-Heptene, n-Heptane, 2-ethyl-Butanal, 4-Methyl-3-penten-2-one, Isobutyl acetate, 2-Hexanone, n-Hexanal, gamma-Butyrolactone, n-Butyl acetate, (E)-2-Hexenal, 1-Octene, n-Octane, 2-Heptanone, n-Heptanal, Benzaldehyde, 1-Nonene, n-Nonane, 6-Methyl-5-hepten-2-one, 2-pentyl-Furan, b-Pinene, n-Octanal, p-Cymene, DL-Limonene, Styrene, Eucalyptol, n-Nonanal, 2-Ethylhexanol, 3-Methylhexane, Butyraldehyde, Ethylbenzene, Ethyl butanoate, toluene, undecane, H2O, CO, NO, N2O, NO2, ammonia, Acetophenone, 4-methylphenol, Dodecane, Dimethyl pyrazine, 2-Pentanol, 2-butanol, 2-pentene, 2-methyl-butyl isobutyrate, 2-methoxy-5-methylthiophene, amyl isovalerate; 2-methylbutyl 2-methylbutyrate, 6-tridecane, 3-methyl 1H-pyrrole, 2-methyl-3-(2-propenyl)-pyrazine, 2,3-dimethyl-5-isopentylpyrazine, Methyl thiolacetate, Methyl thiocyanate, Hydrogen cyanide, 2-aminoacetophenone, 1-undecene, Formaldehyde, Dimethyl ether, carbon dioxide, pentafluoropropionamide, Methyl cyclohexane, 2-methylbutanol, N-propyl acetate, Butanal, 2,5-dimethyl-tetrahydrofuran, Carbon disulfide, methyl propanoate, methyl butanoate, 6-methyl-5-hepten-2-one, 2,5-dimethylpyrazine, Hydrogen sulfide, Propanol, Indole, 1,1,2,2-tetrachloroethane, Butanol, 2-tridecenone, 3-hydroxy-2-butanone, 1-hydroxy-2-propanone, 3-nitro-benzenesulfonic acid, Isobutyric acid, methyl ester, 1,2-dimethyl-benzene, 2-ethyl-1-hexanol, Isopentyl 3-methylbutanoate, 2,4-dinitro-benzenesulfonic acid, Decanal, 2-methyl-1-propanol, 2-phenylethanol, 1,4-dichlorobenzene, 2-methylbutanoic acid, methyl mercaptan, 2-nonanone, 3-methyl-1-butanol, 3-methylbutanoic acid, dimethyl trisulfide, dimethyl disulfide, and acetic acid.

3. The device according to claim 1, wherein the one or more VOCs has a concentration range selected from 0.1 ppb-1 ppb, 1 ppb-5 ppb, 5 ppb-10 ppb, 10 ppb-50 ppb, 50 ppb-100 ppb, 100 ppb-200 ppb, 200 ppb-300 ppb, 300 ppb-500 ppb, 500 ppb-1 ppm, 1 ppm-2 ppm, 2 ppm-5 ppm, 5 ppm-10 ppm, 10 ppm-100 ppm, 100 ppm-200 ppm, 200 ppm-500 ppm, 500 ppm-1000 ppm, 1000 ppm-2000 ppm, and 2000 ppm-5000 ppm.

4. The device according to claim 1, wherein one or more of the plurality of sensor arrays further comprises a plurality of physiological sensors, each physiological sensor is adapted to detect at least one parameter selected from heart rate, pulse rate, respiratory rate, blood oxygen saturation, blood pressure, hydration level, stress, position & balance, body strain, neurological functioning, brain activity, blood pressure, cranial pressure, auscultatory information, skin and body temperature, eye muscle movement, sleep, cholesterol, lipids, blood panel, body fat density, and muscle density.

5. The device according to claim 1, wherein the interface comprises a WiFi card, a Bluetooth card, or a USB card.

6. The device according to claim 1, wherein the interface comprises a display having a touch screen adapted to receive manual input from a user.

7. The device according to claim 1, wherein the fixing member is selected from armband, wound dressing, sleeve, jacket, eye wear, goggle, glove, watch, wristband, bracelet, nose ring, ear bud, earphone, article of clothing, hat, headband, headset, bra, jewelry, patch, and adhesive tape.

8. The device according to claim 1, wherein the one or more health conditions are selected from bacterial infections, inflammatory disorders, Pancreatitis, Pneumonia, Sepsis/Septic shock, hypoxia, flu, asthma, COVID-19, virus, Fungi, bacteria, Hypoglycemia, diabetes, cancer, Melanoma in skin cancer, colorectal cancer, lung cancer, bladder cancer, breast cancer, colon cancer, head and neck cancer, ovarian cancer, prostate cancer, kidney cancer, gastric cancer, uterine cancer, liver cancer, Endocrine and Metabolic disease, Addison's Disease, Hyperaldosteronism, Hyperlipidemia, Gastrointestinal and Hepatic disease, Crohn's disease, Nonalcoholic steatohepatitis Peptic ulcer disease, Neurologic disease, Seizure, Sleep apnea, Psychiatric disease, Alzheimer's disease, Autism spectrum disorder, ulcerative colitis, irritable bowel syndrome, metabolic disorder, multiple sclerosis, pulmonary arterial hypertension, pre-eclampsia, chronic kidney disease, Epileptic patients, Parkinson's disease, idiopathic Parkinson's, atypical Parkinsonism, hyper/hypo glycaemia, ketone, fat burning, human performance, and ketoacidosis.

9. The device of claim 1, wherein, during operation, at least one of the one or more processors generate data by executing a method selected from Naïve Bayes, principal component analysis (PCA), support vector machine (SVM), multi-layer perception (MLP), generalized regression neural network (GRNN), fuzzy inference systems (FIS), self-organizing map (SOM), radial bias function (RBF), genetic algorithms (GAS), neuro-fuzzy systems (NFS), adaptive resonance theory (ART), partial least squares (PLS), multiple linear regression (MLR), principal component regression (PCR), discriminant function analysis (DFA), linear discriminant analysis (LDA), cluster analysis, and nearest neighbor.

10. The device of claim 1, wherein, during operation, at least one of the one or more processors executes an algorithm using the generated data as an input and obtains an output that correlates to one health condition.

11. The device of claim 10, wherein, during operation, the at least one of the one or more processors further comprises a memory that stores an executable program for processing the electrical signals from the plurality of sensors.

12. The device of claim 1, wherein each of the sensor array comprises 2 to 32 sensors.

13. The device of claim 1, wherein the one or more openings are covered by a membrane that is waterproof, breathable, or both.

14. A method for diagnosing one or more health conditions of a subject in needed thereof, comprising:
   attaching the device of claim 4 to a skin surface of the subject;
   obtaining data corresponding to VOCs, vital signs, or both of the subject; and
   correlating the data with one or more health conditions.

15. The method according to claim 14, further comprising displaying the data on the interface of the device.

16. The method according to claim 14, further comprising: transmitting the obtained data to a computer for storage or for further processing.

17. A system for monitoring one or more health conditions of a subject in need thereof, comprising:
   the device of claim 1 physically, electrically, and/or signally connected to a host device,
   wherein the host device is selected from wearable device, wearable watch, wearable band, glucose patch, wearable clothing, wearable jewelry, head-mounted display, smart ring, smart glasses, smart card, smart shoe, e-textile, smart connected products, wearable computer, healthcare device, medical device, hospital stretcher, defibrillator, anesthesia machine, patient monitor, sterilizer, Electrocardiogram machine, surgical table, blanket and fluid warmer, electrosurgical unit, bandage, heating pad, prosthetic device, artificial arm, artificial leg, orthotic device, leg brace, shoe insert, wound dressing system, transparent films dressing, foams dressing, hydrocolloids dressing, alginates dressing, composites dressing, cloth dressing, antimicrobial dressings, low adherent dressings, semipermeable films dressing, gauze sponge dressing, gauze bandage dressing, non-adherent pads, non-adherent wet dressings, calcium alginates dressing, hydrogel dressing, hypothermia bag, gas chromatography (GC), mass spectrometry, gas chromatography-mass spectrometry (GC-MS), infrared spectroscopy, and a combination thereof.

18. The system of claim 17, wherein the device is signally connected using a wireless communication protocol and/or is electrically connected by plugging into a power source in the host device.

* * * * *